US008482576B1

(12) United States Patent
Yelsey

(10) Patent No.: US 8,482,576 B1
(45) Date of Patent: Jul. 9, 2013

(54) INTERACTIVE BROWSER-BASED SEMIOTIC COMMUNICATION SYSTEM

(76) Inventor: Alan A. Yelsey, Excelsior, MN (US)

( * ) Notice: Subject to any disclaimer, the term of this patent is extended or adjusted under 35 U.S.C. 154(b) by 0 days.

(21) Appl. No.: 13/447,622

(22) Filed: Apr. 16, 2012

Related U.S. Application Data

(63) Continuation of application No. 13/367,609, filed on Feb. 7, 2012.

(51) Int. Cl.
G09G 5/00 (2006.01)
G09G 5/02 (2006.01)
G06K 9/00 (2006.01)
G06F 17/00 (2006.01)
G06F 15/18 (2006.01)
G06F 3/00 (2006.01)
G06F 3/048 (2006.01)

(52) U.S. Cl.
USPC ........... 345/589; 345/581; 345/594; 345/619; 382/162; 382/165; 700/94; 706/12; 706/15; 706/20; 715/204; 715/700; 715/716; 715/764

(58) Field of Classification Search
USPC .................. 345/418, 581, 589, 593–594, 597, 345/619, 440.1; 358/448, 452; 382/162, 164–165, 170, 180, 189, 176; 700/17–18, 700/83, 89–90, 94; 704/200, 270, 278; 715/201–204, 273, 275, 700–704, 716, 726–728, 764; 725/37, 39, 47, 135, 105; 706/12–16, 20, 25, 45, 61
See application file for complete search history.

(56) References Cited

U.S. PATENT DOCUMENTS

| | | | | |
|---|---|---|---|---|
| 3,572,915 | A * | 3/1971 | Butterfield | 352/1 |
| 2002/0176591 | A1* | 11/2002 | Sandborn et al. | 381/118 |
| 2007/0112714 | A1* | 5/2007 | Fairweather | 706/46 |
| 2009/0077094 | A1* | 3/2009 | Bodain | 707/10 |
| 2010/0070448 | A1* | 3/2010 | Omoigui | 706/47 |
| 2010/0158470 | A1* | 6/2010 | Tzoukermann et al. | 386/46 |
| 2011/0041059 | A1* | 2/2011 | Amarasingham et al. | 715/716 |
| 2011/0072054 | A1* | 3/2011 | Yoon et al. | 707/802 |
| 2011/0119627 | A1* | 5/2011 | Cho et al. | 715/811 |
| 2012/0066735 | A1* | 3/2012 | Pham et al. | 725/116 |
| 2012/0173776 | A1* | 7/2012 | Jones | 710/65 |
| 2012/0189270 | A1* | 7/2012 | Bedingfield et al. | 386/230 |

* cited by examiner

Primary Examiner — Wesner Sajous
(74) Attorney, Agent, or Firm — Westman, Champlin & Kelly, P.A.

(57) ABSTRACT

Embodiments described herein pertain to a standardized set of tools for representing and exploring the components and characteristics of complex systems. In one embodiment, the tools are deployed in a computer network environment so as to engage a social network such that its members utilize the tools to collaboratively construct and maintain a dynamically evolving learning environment in which complexity is represented and explored.

20 Claims, 15 Drawing Sheets

INTERACTIVE BROWSER-BASED SEMIOTIC COMMUNICATION SYSTEM

CROSS-REFERENCE TO RELATED APPLICATION

The present application is a continuation of and claims priority of U.S. patent application Ser. No. 13/367,609, filed Feb. 7, 2012, the content of which is hereby incorporated by reference in its entirety.

BACKGROUND

It is difficult to precisely define complexity. Though certainly an oversimplification, one possible view of the concept is that to be complex is to be intricate or complicated. In practice, when complexity is studied, it is often within the context of a system. Complex systems are typically rich with opportunities for discovery and analysis. This is true at least because such systems often include an elaborate arrangement of interconnected parts that are influenced by multiple variables such that certain groups of parts collectively demonstrate properties that are not necessarily apparent in the properties of the individual parts. Unfortunately, some of the most interesting of the more intricate and complicated patterns often go undetected. Or, if detected, such patterns are often not understood well enough to provide meaningful insight. This is unfortunate because such patterns within complex systems have the potential to fuel the discovery of particularly useful and interesting knowledge.

More of these complex patterns would be detected and understood if there were an effective and at least somewhat standardized tool for documenting and navigating through the components and characteristics of a complex system. Further, deploying such a tool in a manner that effectively leverages modern social and computer networking technologies would enable a collaborative and dynamic learning environment that would be especially conducive to the derivation and discovery of complex patterns and therefore the derivation and discovery of useful and interesting knowledge.

The discussion above is merely provided for general background information and is not intended for use as an aid in determining the scope of the claimed subject matter.

SUMMARY

A standardized set of tools for representing and exploring the components and characteristics of complex systems is described herein. In one embodiment, the tools are deployed in a computer network environment so as to engage a social network such that its members utilize the tools to collaboratively construct and maintain a dynamically evolving learning environment in which complexity is represented and explored.

DETAILED DESCRIPTION OF ILLUSTRATIVE EMBODIMENTS

1. Illustrative Operating Environments

Figure 1:
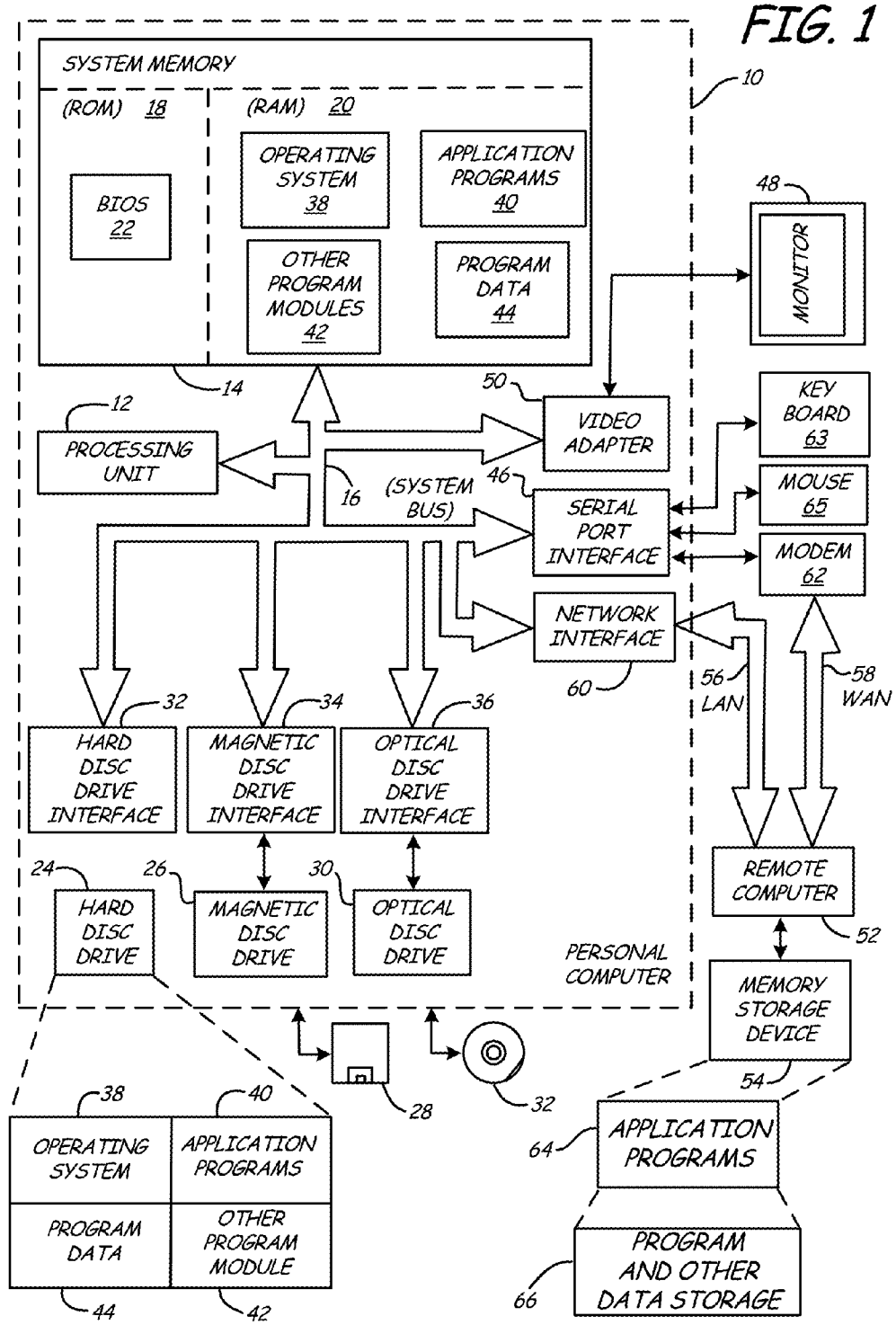
FIG. 1 is a block diagram of a computer system.

Embodiments of the present invention may illustratively be applied in the context of a computer system. FIG. 1 is a block diagram of an exemplary computer system within which embodiments of the present invention may be implemented. The system includes a conventional personal computer 10, including a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention may be applied in the context of computer systems other than the FIG. 1 personal computer 10. Other appropriate computer systems include handheld devices, tablet devices, multi-touch input devices, e-reader devices, any other consumer electronic device, mainframe computers, multi-processor systems, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Personal computer 10 further includes a hard disc drive 24, a magnetic disc drive 26, and an optical disc drive 30. Magnetic disc drive 26 can illustratively be utilized to read from or to write to a removable disc 28. Optical disc drive 30 can illustratively be utilized for reading data from (or writing data to) optical media, such as a CD-ROM disc 32. The hard disc drive 24, magnetic disc drive 26 and optical disc drive 30 are connected to the system bus 16 by a hard disc drive interface 32, a magnetic disc drive interface 34, and an optical disc drive interface 36, respectively. The drives and their associated computer-readable media provide nonvolatile storage for the personal computer 10. Other types of media that are readable by a computer may also be used in the exemplary operation environment.

A number of program modules may be stored in the drives and RAM 20, including an operating system 38, one or more application programs 40, other program modules 42 and program data 44. In particular, one or more of the other program modules 42 can illustratively be part of an interactive portal for facilitating the representation and exploration of complexity. For example, the portal may include features consistent with one or more portal features that are part of embodiments of the present invention described below in greater detail with reference to other Figures.

Input devices including a keyboard 63 and a mouse 65 are functionally connected to system bus 16 through a serial port interface 46 that is coupled to system bus 16. Input devices could be connected utilizing other interfaces such as a universal serial bus (USB). Monitor 48 is connected to the system bus 16 through a video adapter 50. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 1. The network connections depicted in FIG. 1 include a local area network (LAN) 56 and a wide area network (WAN) 58. Such network environments are commonplace in the art. The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the serial port interface 46. These are but examples of network implementations within the scope of the present invention.

In a networked environment, program modules depicted relative to the personal computer 10, or portions thereof, may be stored in the remote memory storage device 54. For example, application programs 64 may be stored utilizing memory storage device 54 and may include at least a portion of an interactive portal for facilitating the representation and exploration of complexity, embodiments of which will described below in greater detail below with reference to other Figures. In addition, data associated with an application program, such as the interactive portal consistent with embodiments of the present invention, may illustratively be stored within data storage 66. Data storage 66 is associated with memory storage device 54 (alternatively, or in combination, the application data may be stored within one of the data storage locations associated with computer 10). It will be appreciated that the network connections shown in FIG. 1 are exemplary and other means for establishing a communications link between the computers, such as a wireless interface communications link, may be used.

Notwithstanding the broad applicability of the principles of the invention described above, it should be understood that the configuration of the exemplary embodiment as an application program that is stored on, and enables data to be stored on, a remote computer such as remote computer 52 provides significant advantages. For example, such a configuration minimizes the functional requirements (e.g., storage capacity) of personal computer(s) 10 and enables a broader range of potential adaptive control features, simplified system updating and upgrading features, and also simplified debugging and troubleshooting features.

2. Illustrative Application Architecture

Figure 2:
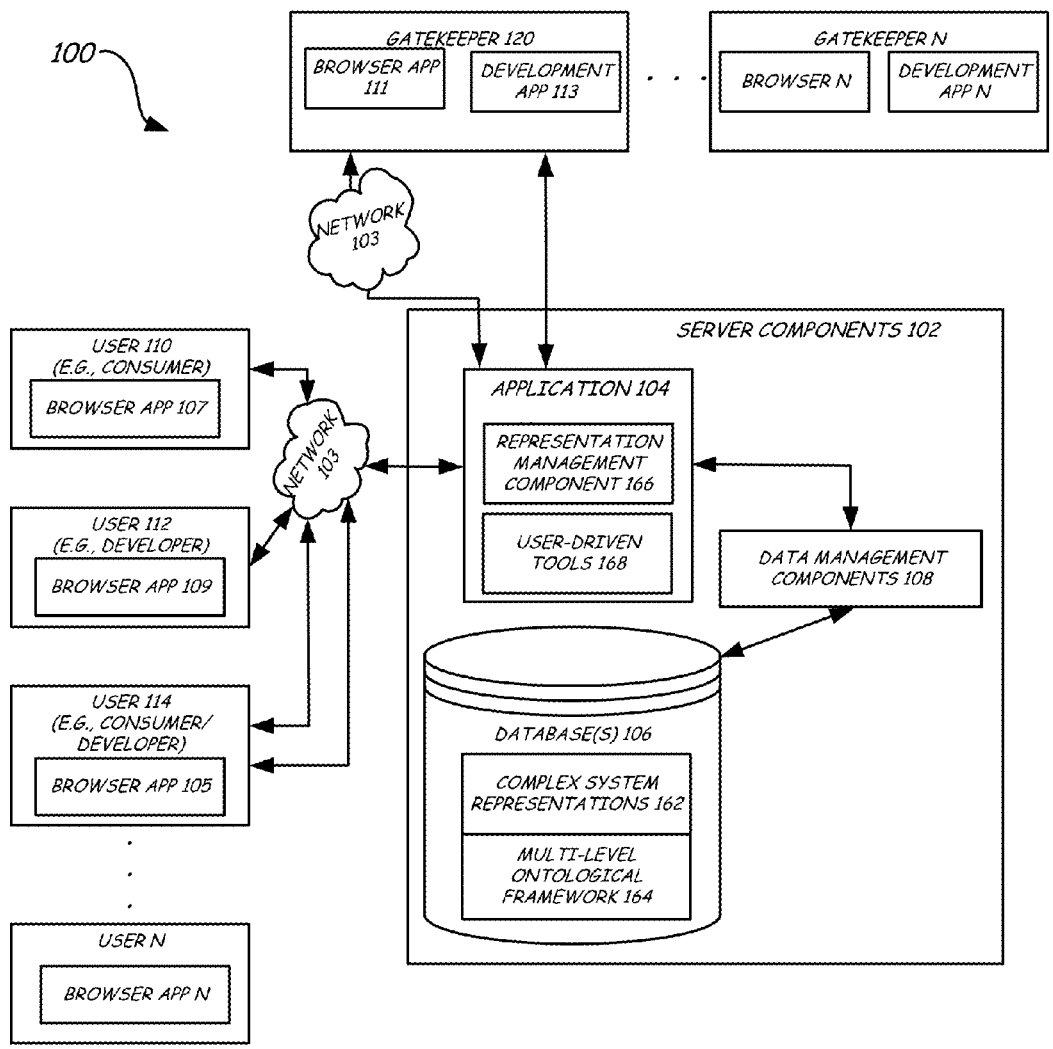
FIG. 2 is a schematic representation of a complex information interaction system that encompasses an interactive portal for facilitating the representation and exploration of complexity.

FIG. 2 is a schematic representation of a complex information interaction system 100 that encompasses an interactive portal for facilitating the representation and exploration of complexity, various components and features of which will be described throughout the remainder of the present description. System 100 includes server components 102, which include one or more databases 106. Databases 106 are illustratively utilized within system 100 to store (in whole or in part) representations 162 of complex systems and a related framework 164, embodiments of which will be discussed below in relation to other Figures. The server components 102 also include a complex information interaction application 104 and a set of data management components 108. Data management components 108 are illustratively configured to respond to input commands (e.g., automatically generated and/or human-user initiated commands) originating from the application 104. For example, components 108 illustratively interact with database 106 so as to manage the storing and retrieving of the representations 162, framework 164, and other related data based on commands from the application 104. Components 108 are also configured to manage any of a variety of other database management functions such as, but not limited to, data access management and functions related to maintaining data security.

Those skilled in the art will appreciate that application 104, data management components 108 and database 106 need not all be, as illustrated, in the same server environment or even in the same location. They could just as easily be distributed across multiple server environments and/or multiple locations without departing from the scope of the present invention. All possible combinations of distribution are contemplated and are to be considered within the scope of the present invention.

Complex information interaction application 104 is illustratively a network-based application that includes a public web interface maintained on the Internet or some other computer network. In one embodiment, application 104 is coded in a browser-supported language. For example, not by limitation, application 104 can be coded in JavaScript in combination with a browser-rendered markup language such as, but not limited to, HTML. The code might also encompass style sheets as a means for influencing the presentation of the application to the user. Those skilled in the art will appreciate that this is but one of many examples of how a web-based application can be implemented without departing from the scope of the present invention. Other implementations, including any coding combination implementing any web application development tools are also within the scope. Regardless of the precise implementation, users are illustratively able to interact with application 104 remotely utilizing any of a wide variety of different computing devices. Devices within the scope of the present invention include, but are certainly not limited to, a mobile phone, a laptop PC, a desktop PC, a mobile device, a personal digital assistant, a multi-touch input device, an e-reader device, a tablet PC, a portable music player, or any other similar electronic device.

Accordingly, the user-focused front end of application 104 is, in one embodiment, reliant upon a client side web browser for ultimate execution, including presentation to and interaction with a user of the browser/application. For this reason, browser applications 107, 109, 105 and 111 are shown in FIG. 2 as supporting access to application 104 by users 110, 112, 114 and 120, respectively. As will become apparent, users 110, 112 and 114 (and probably also the gatekeeper user 120) are able to utilize application 104 in combination with their browser application to experience (e.g., view, listen to, navigate through, etc.) the complex system representations 162 (and the related framework 164) stored, in whole or in part, in database 106. Further, users 110, 112 and 114 (and probably also the gatekeeper user 120) can also, if they wish, utilize application 104 in combination with their browser application to make contributions to and edit the complex system representations 162 (and related contextual portions of framework 164) stored, in whole or in part, in database 106. As will also become apparent, gatekeeper 120 manages, to some extent, modifications and additions to the representations 162 (and related contextual portions of framework 164) stored, in whole or in part, in database 106.

For the purpose of simplifying the description of the present invention, only the representative set of users 110, 112, 114 and 120 are shown as remotely accessing application 104 over a network 103, which is illustratively but not necessarily the Internet. Further, it should be understood that it is contemplated that different users could, in theory, access application 104 over different computer networks rather than, as is illustrated in FIG. 2, over the same network. Further, one or more users could access application 104 by means other than over a public or other computer network. For example, user 120 is shown in FIG. 2 as having both network-based and more direct access to application 104. User 120 may, in one embodiment, also have network-based or more direct access to either or both of components 106 and 108. Any combination of computer-implemented user access connection/communication schemes from accessing the server components 102 should be considered within the scope of the present invention. Any user can be provided with public remote and/or more direct access to the server-based components of system 100 (e.g., components 102) without departing from the scope of the present invention.

Gatekeeper 120 is illustratively a system administrator having broader access rights and privileges than users 110, 112 and 114. Gatekeeper 120 controls, at least to some degree, the configuration and functionality of components 104, 106 and 108, and therefore has the ability to affect the application 104 experience from the perspective of users 110, 112 and 114. In one embodiment, the gatekeeper 120 sets and/or enforces conditions under which the complex system representations 162 and framework 164 may be modified or expanded upon by users 110, 112 and 114. The described network architecture enables gatekeeper 120 to make system adjustments and modifications without having to create and distribute frequent software updates to the users. Instead, the gatekeeper is able to make changes quickly and, if desired, frequently. Of course, it is contemplated that there may be multiple or even many gatekeepers working independently or cooperatively to maintain and manage the database 106 content and/or its related functional components.

Those skilled will appreciate that there are many specific implementation options for the physical and functional configuration of database 106 and its related components 108. Each option has its own set of drawbacks and benefits. The best option will depend at least upon available resources both in terms of equipment and personnel. For the purpose of providing a complete and thorough description of embodiments of the present invention, it is worth expounding upon a few different of the many possibilities.

In one embodiment, at least part of database 106 is implemented as a relational database comprising a collection of tables that store particular sets of data pertinent to the stored representations 162, framework 164 and other related data. However, without departing from the scope of the present invention, database 106 can include any other type of database technology such as but certainly not limited to an object database, an object-relational database, or a native xml database. All of these and any other database implementation should be considered within the scope of the present invention.

Those skilled in the art will appreciate that the configuration and functionality of components 108 will vary as necessary to accommodate whichever type of database technology is included as part of the implementation of database 106. For example, in a scenario in which database 106 includes a SQL database implementation, such as MySQL or SQL Server offered by Microsoft Corporation of Redmond, Wash., then the data management components 108 are likely to include a PHP or Python access/security layer. In an object-relational (O-R) database scenario, components 108 illustratively include support for referring to stored data in terms of objects and their properties rather than the more specific elements of a more traditional database schema (e.g., a table-based schema). For example, in order to support the O-R system, components 108 are likely to include a mapping mechanism (e.g., a class-table mapping mechanism) that facilitates a translation of object-oriented database calls into corresponding relational database calls.

In still another embodiment, database 106 includes an implementation of NoSQL, such as a MongoDB database implementation. In this case, the database will generally not be organized in tables similar to a relational database but instead will be organized around flat stack objects. One advantage of a NoSQL implementation in the context of the present invention is that it allows for especially efficient access to what are likely to be particularly large data sets. This is true because, generally speaking, a NoSQL implementation requires fewer server resources than, for example, a relational database. Of course, to accommodate a NoSQL implementation, appropriate data management components 108 will be cooperatively implemented. For example, when database 106 includes a NoSQL implementation, components 108 illustratively include a Python, or Ruby, or PHP access/security layer. Of course, those skilled in the art will appreciate that these are but examples of possibilities within the scope of the present invention.

Those skilled in the art will also appreciate that components 106/108 are configured to support any of a plurality of different data format and exchange protocols that enable communication between application 104 and the remote computers of the users 110, 112, 114 and 120. In one embodiment, the protocol is such that it supports a pulling of live code from the database for immediate execution in conjunction with application 104 and/or in conjunction with an application (e.g., the browser application) operating on one of the remote user computers. This capability is particularly well suited for data generative functions of application 104 contemplated in accordance with embodiments of the present invention that will be described below in greater detail in relation to other Figures.

One option for the data format and exchange protocol is XML. However, in one embodiment, application 104 is an Ajax-style web application that supports out-of-band, lightweight calls to database 106. These calls are illustratively initiated using JavaScript and involve formatting data, sending it to the web server, and parsing and working with the returned data. While most browsers can construct, send, and parse XML, JavaScript Object Notation (or JSON) provides a standardized data exchange format that is better-suited for Ajax-style web applications. For example, the parsing required in an XML implementation is simplified or eliminated in the context of a JSON implementation. Thus, in one embodiment, but not by limitation, JSON is utilized as the data format and exchange protocol at least in, but not limited to, embodiments where the application 104 involves a JavaScript implementation in the context of an Ajax web application.

In terms of the particular configuration of components 108 and database 106, the scope of the present invention is not limited to any one particular setup in conjunction with a JSON implementation. For example, in one embodiment, database 106 includes a MongoDB implementation in conjunctions with a Python or Ruby (or any other suitable implementation) in the access/security layer. However, another option within the scope of the present invention is a SQL-type database 106 implementation in conjunction with a PHP access/security layer configured to facilitate a conversion into JSON-type stacks. These are but two examples of JSON implementations within the scope of the present invention. The scope is not limited to these or any other particular implementation.

In accordance with one embodiment of the present invention, at least one of the representations 162 (and its associated portions of framework 164) accessed by way of application 104 is graphically presented (e.g., presented in the context of a portion of framework 164) within the user's browser based on an implementation of Web-based Graphics Language (WebGL) technology. Those skilled in the art will appreciate that WebGL generally refers to a technology involving utilization of JavaScript so as to implement 3D graphics within a user's browser. More particularly, WebGL is a context of the canvas HTML element that provides a 3D graphics API implemented in a web browser without the use of a plug-in. Of course, the WebGL functionality requires the user to operate a WebGL compatible browser. However, it is believed by many in the art that most browsers in the future will support WebGL graphics technology. Compatible browser applications are presently readily available on the Internet and otherwise. It should be noted that the scope of the present invention is not limited to WebGL technology specifically. Other similar technologies (e.g., similar technology offered by Microsoft Corporation of Redmond, Wash.) can be included in the system integration without departing from the scope of the present invention.

Audio within web applications is currently most frequently delivered through plugins such as Flash and QuickTime. This may be true in the context of system 100. However, in accordance with one aspect of the present invention, at least one of the representations 162 accessed by way of application 104 includes audio presented within the user's browser based on an implementation of a JavaScript API for processing and synthesizing audio. Accordingly, in one embodiment, audio is synthesized and processed directly in JavaScript without use of a plug-in. In one embodiment, audio is managed through the AudioData API (Mozila Firefox) and/or the WebAudio API (Chrome and Sarari) thereby enabling audio information to be efficiently manipulated directly or at least relatively more directly upon a user's hardware responsible for audio data management. In one embodiment, the audio is implemented within the applications such that the representation includes the audio used with graphics generated using the canvas 2D and/or WebGL 3D graphics APIs.

3. The VisualY Language

Words that humans think, speak and write are mostly based upon the incremental development of language instead of any purposefully invented system of communication. In most cases, the origin of these words dates back hundreds and even thousands of years—perhaps 50 to 100 generations. However, it has been only within about the past 400 years (spanning just 10 or so generations) that an understanding of the science of our world and existence entered a degree of accuracy and certainty that could reasonably serve as a workable outward foundation of accurate knowledge and thought.

Under the circumstances, language has developed into something other than a scientifically founded invention having as its objective being a most effective means of organizing and communicating information and knowledge. Instead, language has become a significantly limited and generally imprecise accumulation of human constructs that once established became very difficult to modify or discard. And because humans generally think within the confines of language, they therefore find it very difficult to work outside of it. It is therefore both reasonable and logical for the continued advancement of human understanding that current language-driven systems for organizing and communicating information and knowledge be improved or replaced.

Application 104, in accordance with one aspect of the present invention, is implemented in a manner the same (or similar) as described in relation to FIG. 2 but is done so as part of a scheme for overcoming the noted and other shortcomings of current systems of language. More particularly, application 104 is programmed to provide an advanced computer-implemented system for managing and presenting information and knowledge in a way that more accurately addresses how the components of the world and universe are actually organized—in particular as synchronous and asynchronous complex systems. In contrast, current systems of language are frustratingly linear in that they are largely dependent upon words that in many cases are only capable of expressing a very limited scale and scope of complexity.

In one embodiment, a key function of application 104 is to facilitate representation and communication of information and knowledge in accordance with a dynamic interactive visual and auditory language, which will be referred to herein as the language of VisualY. As will become apparent, an instantiation of the VisualY language will most often be presented as a visual and/or auditory representation of information/knowledge set against the context of all or a portion of a multi-level ontological system of maps and map views. The system of map and map views is illustratively the framework 164 in FIG. 2. The framework 164 may be referred to herein as the multi-level ontological model framework 164, as model framework 164, or as the VisualY model framework 164. The information/knowledge representations are illustratively the representations 162 in FIG. 2. The representations 162 may be referred to herein as the VisualY representations 162.

Application 104 utilizes a management component 166 to facilitate the creation, organization, collection, modification, transformation, presentation, navigation, browsing, searching, experiencing, displaying, storage, retrieving, transference, and otherwise communication or manipulation of instantiations of the VisualY language. Accordingly, application 104 utilizes management component 166 to facilitate the creation, organization, collection, modification, transformation, presentation, navigation, browsing, searching, experiencing, displaying, storage, retrieving, transference, and otherwise communication or manipulation of the VisualY representations 162, most often presented in the context of all or a portion of the VisualY model framework 164. While the representations 162 and the model framework 164 are being presented as elements separately stored in database 106, the line between these two components in actual implementation is not likely to be so distinct. Accordingly, it is likely also true that application 104 utilizes management component 166 to facilitate the creation, organization, collection, modification, transformation, presentation, navigation, browsing, searching, experiencing, displaying, storage, retrieving, transference, and otherwise communication or manipulation of the VisualY model framework 164.

Application 104 also includes a set of user-driven development tools 168. Tools 168, which will illustratively be referred to herein as the VisualY tools or collectively as the VisualY toolset, are utilized by a user (e.g., by any or all of users 110, 112, 114 and 120 interacting with application 104 by way of a web browser) to interact with instantiations of the VisualY language as described in the paragraph before this one. This means that the VisualY toolset 168 may be utilized by the users to create and/or modify VisualY representations 162 and/or the VisualY model framework 164. In one embodiment, it is within the scope of the present invention for each user to each create their own VisualY instantiations and utilize functions included within application 104 to share access and/or modification rights as desired with one another. However, in another embodiment, the application is configured to enable all of the users to access and/or modify the same VisualY instantiations.

Thus, in one embodiment, application 104 operates in a manner similar to the known Wikipedia system currently made available on the WorldWideWeb at wwwwikipediaorg. For example, application 104 illustratively enables the users to selectively access VisualY instantiations but the users are also able to use the VisualY toolkit 168 to collectively, as the community of users of application 104, add to, delete or otherwise modify the VisualY instantiations or at least portions thereof. This illustratively includes the collaborative adding to, deleting and/or modifying of the VisualY model framework 164 and/or the VisualY representations 162.

In one embodiment, one or more gatekeepers, an example of which is gatekeeper 120, are provided with access to administrative functions that enable them to approve or reject changes made by the broader user community to one or more instantiations of the VisualY language. Those skilled in the art will appreciate that this authority to accept or reject changes can be manifested in many different ways. For example, in one embodiment, no changes are allowed without approval by a gatekeeper. In other embodiment, changes made by some users are allowed without approval but changes made by other users require approval. Further, different users may be assigned different access rights in terms of what specific types of changes they are allowed to make to VisualY instantiations. These rights may vary from one instantiation to the next or may be consistent across an entire collection of instantiations.

In response to user-initiated command interactions with application 104, a VisualY instantiation (e.g., a combination of a representation 162 and a corresponding model framework 164 context) is retrieved by component 166 and, in one embodiment, all or a portion of it is presented to a user (e.g., displayed on a display such as but not limited to display 48 in FIG. 1, and/or provided in part as audio, is provided in a conveniently printable format, etc.). In one embodiment, this process includes data management components 108 receiving from component 166 a request (e.g., a user or application initiated query originating from one of browser applications 105, 107, 109 or 113) that specifies, either directly or indirectly, all or a portion of the VisualY instantiation to be retrieved from database 106. The requested representation/ model framework data is retrieved from the database 106 and returned to components 108 in the form of database results. In one embodiment, components 108 include a data formatting component that formulates the database results into a proper format (e.g., a format identified in the request, identified within the retrieved data or otherwise identified in the code of application 104), such as in the form of one or more objects or simply as a data set. In any case, the properly formatted data is provided as an output to application 104 in response to the application request. The results are transmitted over network 103 and presented to the user (e.g., the requesting user) (e.g., one or more of users 110, 112, 114 or 120) through their browser application, which facilitates execution of software code that is part of application 104, though it is within the scope for executed application code to originate from other sources such as but not limited to being embedded within data stored in the database 106.

Figure 3:
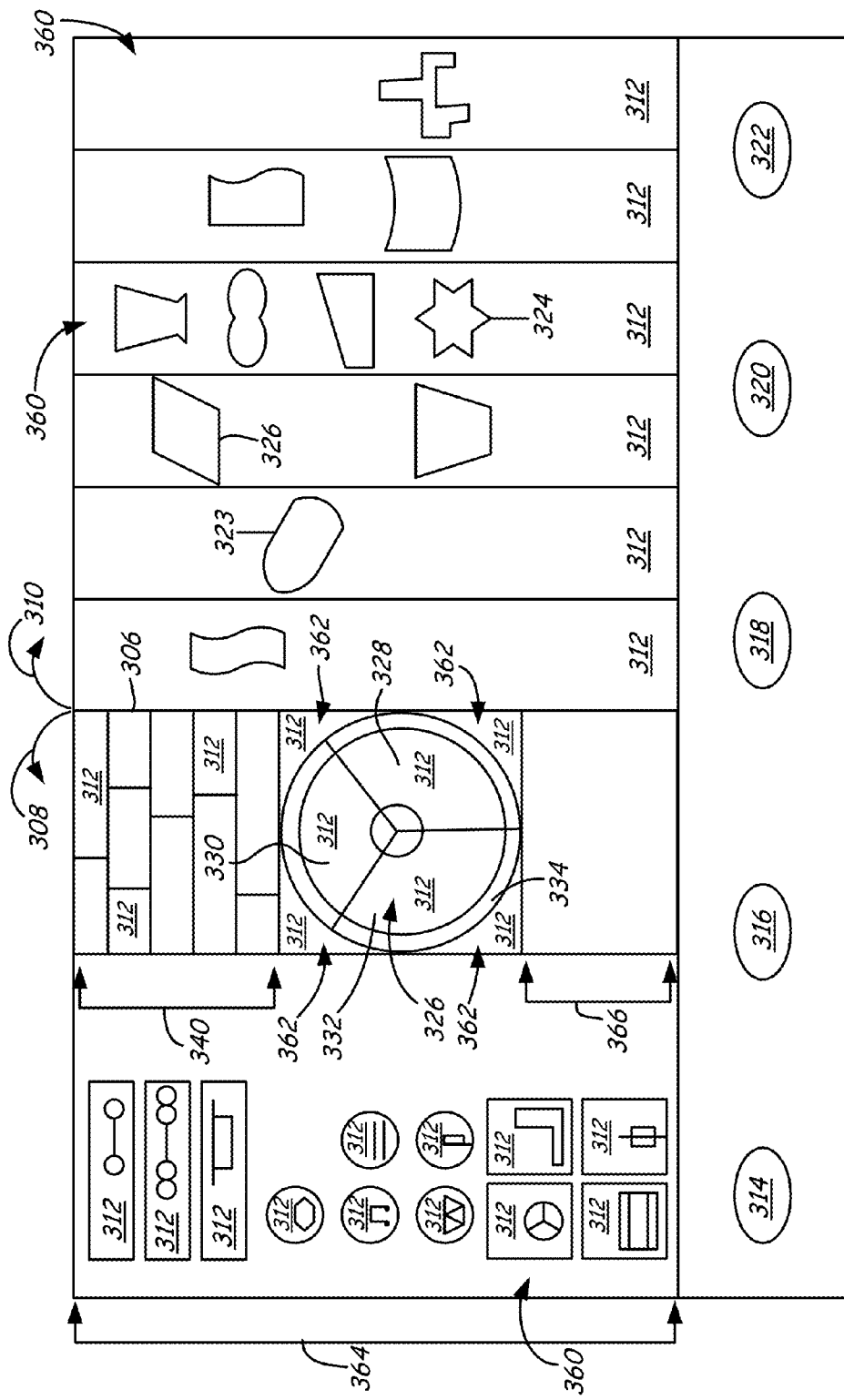
FIG. 3 is a diagrammatic representation of a screenshot that includes one embodiment of a portion of the VisualY model framework.

FIG. 3 is a diagrammatic representation of a screenshot 300 that includes one embodiment of a portion of the VisualY model framework 164 (i.e., the multi-level ontological model framework 164). The portion shown in FIG. 3 represents but one level of the model framework. Line 306 divides the illustrated level into left section 308 and right section 310. Each of sections 308 and 310 is divided into a collection of cells 312, only an exemplary set of which have been included in order to simplify the illustration. Situated at the bottom of the screenshot is a plurality of buttons 314-322 that are not technically part of the model framework but instead are controls for performing functions in relation to a representation 162 depicted in relation to a portion of a displayed model framework level, or for transitioning between representations 162 and/or portions of the model framework 164.

Before proceeding with the description of screenshot 300 and its illustrated portion of the model framework 164, it is first worth noting that, without departing from the scope of the present invention, the configuration and shape of cells 312 may be very different than what is shown in any Figure included herewith. For example, straight lines might be replaced with non-straight lines, or there could be more or fewer cells 312, etc. The stylistic design choices reflected in the Figures provided herewith are intended to be exemplary only and are in no way to be construed as limiting the scope of the present invention.

In one embodiment, some or all of cells 312 are user-selectable (e.g., but not by limitation, by way of a mouse click, voice recognition, touch screen input, gesture recognition, etc.) so as to cause navigation (e.g., a transition of the display/screenshot) to a different level of the model framework 164. When a symbol appears within a cell 312, the symbol illustratively is representative of the subject matter and/or configurations of other cells 312 obtainable through the symbol-containing cell. For example, in one embodiment, not by limitation, the cell 312 that includes symbol 324 indicates to the user that there are at least four additional cells 312 that can be navigated to by selecting the cell 312 (i.e., one symbol for each of the additional cells 312). Similarly, the cell 312 that includes symbol 326 indicates to the user that there are at least two additional cells 312 (i.e., represented by the two symbols) that can be navigated to by selecting the cell 312 that encompasses the two symbols. This is not to say that there must always be a symbol for every cell 312 reachable through the symbol-containing cell 312. The numbers of symbols included in a given cell 312, for example, may be dependent upon the current displayed size of the given cell. In one embodiment, the application is configured to change the size of the symbols or even change the symbols themselves depending upon cell size. In one embodiment, a short-hand symbol (e.g., a dot) is utilized to show existence of a particular symbol when the symbol-containing cell is not large enough to display the particular symbol in a visually appealing way.

It should be noted that the described symbol-based scheme is only an example of how selectability/navigability might be indicated. For example, but not by limitation, the indication could just as easily be a more unified symbol such as a shape containing a dot for each cell 312 in the next selectable level of the model framework. Further, the indication need not necessarily include any symbol per se. It is within the scope of the present invention for the indication to be a letter, a number, a plus sign, any other character, a shape that is not a letter or number, a color, cell shape, cell location, cell location in relation to a separate indication of selectability, a sound, a change in color, a change in sound, a change in characters, or even an animation. Any of these or any other possibility can be utilized to indicate that a particular cell 312 is selectable/navigable to a different level of the model framework 164.

It is also to be understood that an indication of selectability/navigability may be selectively displayed such as based on user preferences or interactions. For example, in one embodiment, an indication is only activated and provided when the user has expressed an interest in the associated cell 312 (e.g., for example, but not by limitation, by "mousing over" the cell). Any process for temporarily or conditionally presenting one or more of the indications should be considered within the scope of the present invention.

The symbols included within a cell 312 may or may not be an indication or reminder of a type of subject matter pertinent to the cell and/or pertinent to corresponding lower levels of the model framework 164 accessible via selection/navigation of the cell. For example, a plant symbol might indicate that components of the model framework 164 accessed through the cell containing the plant symbol pertain to plant-oriented subject matter. It should be noted that an indication of subject matter relevancy need not necessarily be a symbol per se. It is within the scope of the present invention for the indication to be a letter, a number, any other character, a color, cell shape, cell location, a sound, a change in color, a change in sound, a change in characters, or even an animation. Any of these or any other possibility can be utilized to indicate that a given cell 312 pertains to a particular category of subject matter. It is also to be understood that the subject matter indication need not always be displayed for a given cell. In one embodiment, the indication is only displayed when the user has expressed an interest in the associated cell 312 (e.g., for example, but not by limitation, by "mousing over" the cell). Any process for temporarily or conditionally displaying one or more of the subject matter indications should be considered within the scope of the present invention.

Figure 4:
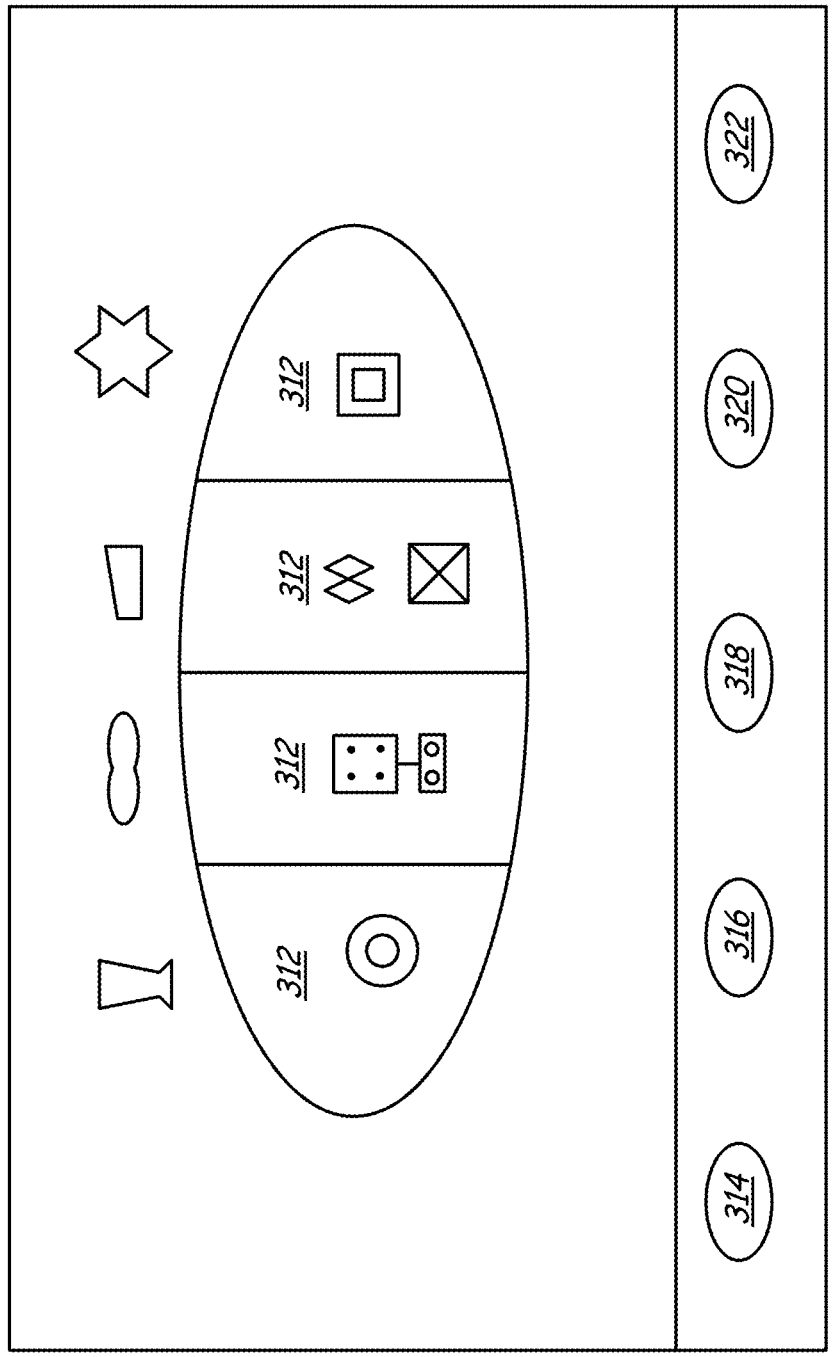
FIG. 4 is a diagrammatic representation of a screenshot that includes a level of the VisualY model framework.

As has been described, the screenshot of FIG. 3 represents only a portion of the VisualY framework 164, namely one level of the framework. FIG. 4 is a diagrammatic representation of a screenshot 400 displaying another level included in the framework. The level shown in FIG. 4 includes its own collection of cells 312. The plurality of buttons 314-322 are again situated at the bottom of the screenshot in FIG. 4. Again, these buttons are generally not part of the model framework but instead are controls for performing functions in relation to a currently presented VisualY instantiation.

The FIG. 4 screenshot is illustratively what the user sees upon selection of the cell 312 in FIG. 4 that includes symbol 324. In other words, the user navigates from the level of the model framework shown in FIG. 3 to the level shown in FIG. 4 by selecting the cell 312 containing symbol 324. Notably, the cell in the FIG. 3 screenshot that includes symbol 324 is one of four symbols in the cell. The same four symbols appear again in the FIG. 4 screenshot but this time as labels for a set of different cells 312 that include new symbols. The new cells in the FIG. 4 screen shot can illustratively be selected in order to navigate to still another level of the model framework 164. A similar but different set of symbols is utilized in the FIG. 4 cells 312 to again indicate navigability options and/or subject matter relevancy.

Figure 5:
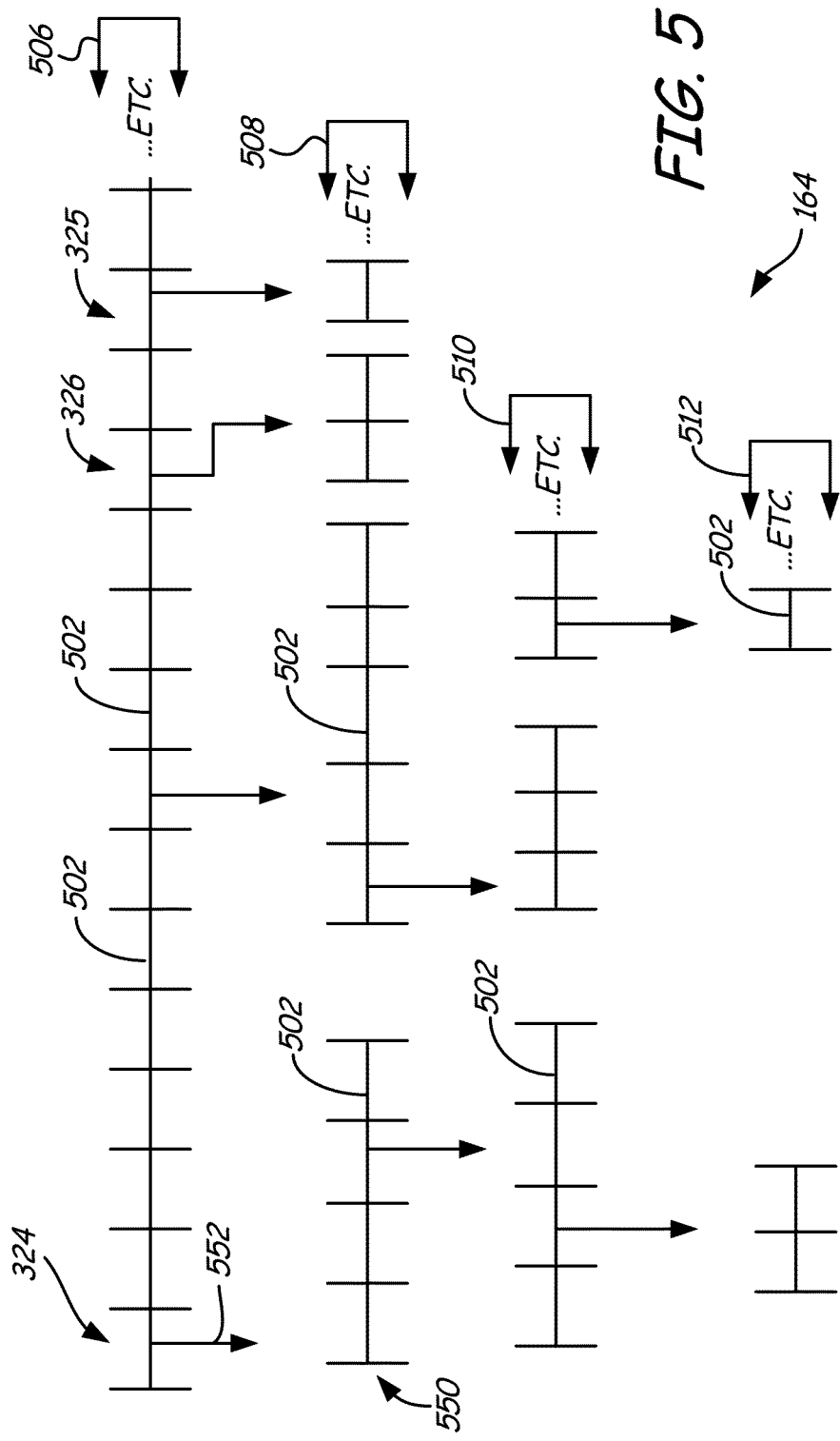
FIG. 5 is a schematic illustration of the VisualY model framework.

FIG. 5 is a broader schematic illustration of an embodiment of a multi-level ontological model framework 164, illustratively the same framework reflected in the screenshots of FIGS. 3 and 4. This schematic illustration is intended to make clearer the hierarchically navigable nature of the model framework 164. Each of a plurality model segments 502 (only a representative few have been specifically labeled in FIG. 5) illustratively corresponds to a cell 312 included in the framework 164. For example, the model segments 502 on a top level 506 illustratively correspond to the cells 312 included in the level of the model framework shown in the screenshot of FIG. 3. The model segment furthest to the left on level 506 illustratively corresponds to the cell in FIG. 3 that includes symbol 324. The arrow 552 in FIG. 5 pointing from level 506 to level 508 indicates that the user is provided with the ability, if desired, to select the symbol 324 cell so as to initiate a transition to the four pointed-at model segments 502 in level 508. These four model segments in 508 illustratively correspond to the cells 312 shown in FIG. 4 such that the transition between levels 506 and 508 illustratively includes a transition of the user interface, as was described in relation to FIGS. 3 and 4.

In addition to levels 506 and 508, the illustration of FIG. 5 also includes levels 510 and 512. Each level includes its own model segments 502, which illustratively correspond to cells 312 included in other levels of the framework 164, and therefore in other screenshots available for display depending user-initiated transitions between levels. Arrows between levels are utilized to represent opportunities to navigate to a particular sub-set of cells 312 that correspond to a sub-set of model segments 502 on a given level.

It is to be noted that the illustration of FIG. 5 does not exactly correspond to the example screenshots shown in FIGS. 3 and 4. The illustration is simplified at least in that an actual implementation very well may include many more model segments 502 corresponding to many more cells 312 included within the model framework 164. Further, an actual implementation very well may include many more levels than just the four levels shown in FIG. 5. Still further, the navigation paths (e.g., schematically represented in FIG. 5 by arrow 552 and the other similar arrows) very well may be more complicated than a simple one-to-several linking of model segments 502. In one embodiment, multiple model segments 502 are linked to the same group of model segments 502 indicating that more than one cell 312 can be selected/navigated to the same screenshot view of a given sub-set of cells 312 within the model framework 164. Those skilled in the art will appreciate the many ways, all to be considered within the scope of the present invention, in which the model framework 164 is able to evolve so as to become more complicated than the illustrated scenario. The illustrated scenario has been intentionally simplified in order to make clear the broad nature of various embodiments of the present invention. The navigation paths incorporated into an actual implementation of model framework 164 can skip levels of the hierarchy up or down, or can otherwise be configured in any manner without departing from the scope of the present invention.

In accordance with one aspect of the present invention, the system is configured to support navigation from a first level within the model framework 164 to a second level even when there is not a cell 312 in the first level that supports direct navigation to the second level. In other words, the user is provided with options for navigating between sub-sets of cells 312 without necessarily following a "connected" path between levels of the framework (e.g., levels 506, 508, 510 and 512).

Figure 6:
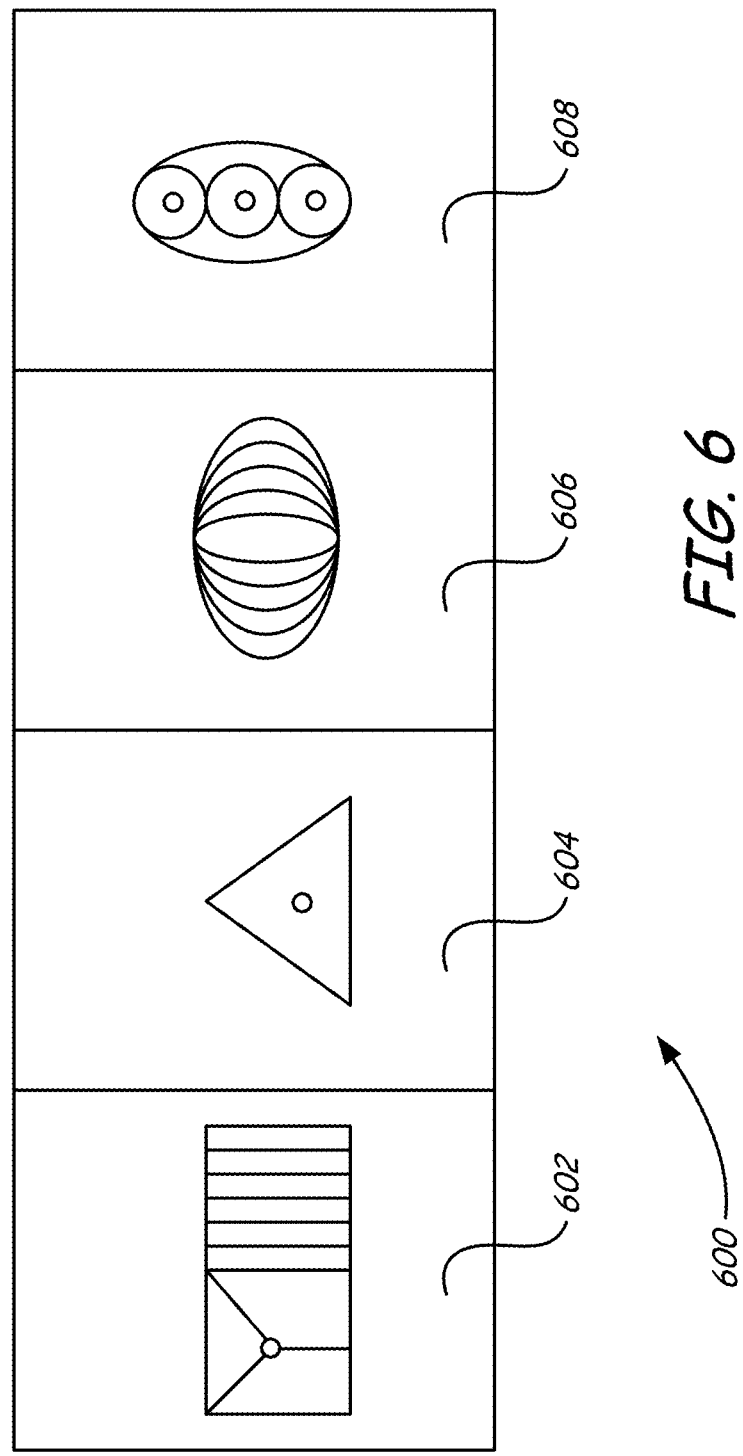
FIG. 6 is a diagrammatic representation of a navigation history tool.

FIG. 6 is a diagrammatic representation of a navigation history tool 600. Tool 600 is an example of one embodiment of how a non-connected navigation path between levels of the framework 164 can be implemented as part of application 104. Component 600 is illustratively rendered on the application display so as to provide a visual indication of a recent (e.g., most recent) navigation path taken through framework 164 in order to arrive at a currently displayed subset of cells 312. Component 600 includes four boxes chronologically arranged from left to right such that the currently viewed level corresponds to the box furthest to the right (i.e., box 608) and the first viewed level corresponds to the box furthest to the left (i.e., box 602). Of course, the two boxes in the middle (i.e., boxes 604 and 606) represent consecutive intermediately viewed levels along the navigation path from the first viewed sub-set of cells 312 to the currently viewed sub-set of cells 312.

The symbols utilized in each of the boxes of component 600 are illustratively indicative (e.g., indicative of subject matter, etc) of the corresponding sub-set of cells 312. For example, the symbol shown in box 602 reflects the fact that the user began at the sub-set of cells 312 reflected in the screenshot 300 of FIG. 3. The triangular symbol shown in box 604 reflects the fact that the user selected a cell 312 that caused navigation to a second sub-set of cells 312 (not illustrated in the Figures of the present description). The oval-shaped symbol shown in box 606 reflects the fact that the user selected a cell 312 that caused navigation to a third sub-set of cells 312 (not illustrated in the Figures of the present description). Finally, the symbol shown in box 608 reflects the fact that the user selected a cell 312 that caused navigation to a currently displayed sub-set of cells 312 (not illustrated in the Figures of the present description).

Component 600 is illustratively configured to support navigation from the screenshot view of cells 312 associated with box 608 to the screenshot view of cells 312 associated with box 602 without visiting the screenshots view of cells 312 associated with either of boxes 604 of 606. The user is essentially able to "jump back" to the screenshot of box 602 (i.e., the view of FIG. 3) by simply selecting (e.g., clicking on, voice activating, touch screen input selecting, gesture detection inputting, etc.) box 602 from user interface component 600. Thus, the user is not forced to back out through the previously visited screenshot views associated with the intermediate boxes 604 and 606 to obtain the previously visited view. The user can, of course, assumedly utilize component 600 to jump back to any screenshot view indicated in the user interface component 600 regardless of how many previously visited sub-sets of cells 312 are included in the record of navigation history. This is but one example of how the hierarchy of the model framework 304 can be navigated through without being strictly bound to a hierarchical sequence.

Figure 7:
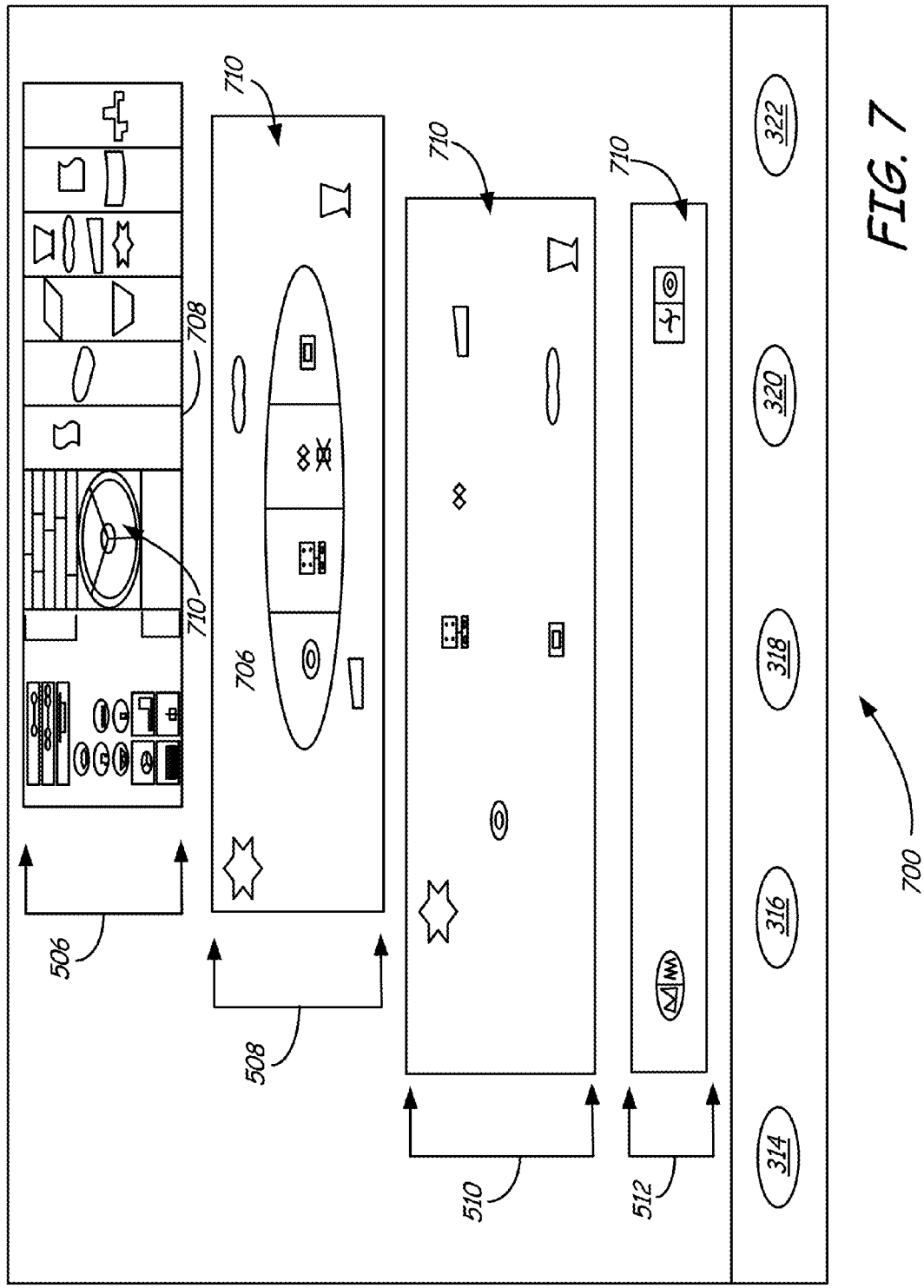
FIG. 7 is a diagrammatic representation of a screenshot including an alternative view of a portion of the VisualY model framework.

Another aspect of the present invention pertains to still another embodiment of how application 104 is configured to support navigation between non-connected collections of cells 312. FIG. 7 is a diagrammatic representation of a screenshot 700. Screenshot 700 is illustratively an alternative view of portions of the multi-level ontological model framework 164. For example, in one embodiment, a user of application 104 has the option of choosing the broader and more encompassing framework display scheme of FIG. 7 instead of (or, as will become apparent, in combination with) the framework display scheme described in relation to FIGS. 3 and 4. While those skilled in the art will appreciate that there are many user input control options for effectuating a transition between different framework display schemes, in one particular embodiment the transition is initiated at least semi-automatically when the user inputs a particular framework navigation command that triggers the transition even though the user may not entirely expect the transition to be a triggered by the particular command. Alternatively, the transition may be initiated more intentionally, for example, when a user chooses to activate a scheme selection mechanism made accessible by way of one of buttons 314-322 or otherwise.

The framework display scheme of FIG. 7 differs from the scheme of FIGS. 3 and 4 in that it represents much more, if not all of, the model framework in a single screen view. In accordance with the FIG. 3/4 scheme, the user navigates from one cell 312 collection to another, for example, from a cell cluster on one level to a cell cluster on another level or between two cell clusters on the same level, such that one cell cluster is shown at a time. However, it should be noted that it is certainly within the scope of the present invention for the FIG. 3/4 scheme to be adapted to support renderings of multiple cell clusters from different framework levels (or even on the same framework level) to be simultaneously rendered and presented to the user in the same screenshot. For example, the framework and related navigation scheme could just as easily be configured such that screenshot 400 of FIG. 4 includes multiple separate sets of cells 312 from the same level or from different levels. It is worth noting that the generally two-dimensional scheme of FIGS. 3/4 make it difficult to depict relationships between cell clusters, especially between cell clusters from different levels. This is disadvantage because certain VisualY representations 162 will utilize color, sound, motion or other information representing mechanisms to show, in the context of the framework 164, relationships between cell clusters and components of cell clusters.

In contrast, the framework display scheme of FIG. 7 enables a simultaneous presentation of multiple cell 312 collections from multiple or all levels of the framework (e.g., levels 506, 508, 510 and 512 as shown in FIG. 5). The scheme is even extensible to show multiple cell clusters from the same framework level. In one embodiment, the screenshot 700 of FIG. 7 is configured such that a user can select (e.g., by way of voice, mouse, touch, gesture or any other input means described herein or otherwise) any of the individual collection of cells 312. This type of selection illustratively causes a direct transition to a different, corresponding display configuration. For example, in one embodiment, selecting item 708 from top level 506 illustratively causes the display to transition to a framework 164 view consistent with screenshot 300 shown in FIG. 3. In another example, selecting item 706 from level 508 illustratively causes the display to transition to a framework 164 view consistent with screenshot 400 shown in FIG. 4. This is not to say that the scope of the present invention is limited to transitioning to a "flat" depiction of cell clusters similar to the FIG. 3/4 presentation scheme. In one embodiment, a cell cluster presentation to which navigation occurs from a component of the FIG. 7 representation is also relational in that it includes depictions of other relatively closely related model framework components. In one embodiment, the related components are greyed out or otherwise de-emphasized in order to highlight a particular cell cluster as the cluster to which the user has navigated relative to the components that are only related to the particular cell cluster. Of course, a mechanism for transitioning back to the "bigger picture" framework view of FIG. 7 is likely to be included as a user-selectable option. This could be but is not limited to a mechanism similar to that shown in FIG. 6 and/or a mechanism made accessible by way of one of buttons 314-322.

In another embodiment, the framework display scheme consistent with screenshot 700 of FIG. 7 is configured to enable user selection (e.g., by way of voice, mouse, touch, gesture or any other input means described herein or otherwise) of any of the open space 710 (only some examples of such space are identified in FIG. 7) on a given framework level. This type of selection illustratively causes a direct transition to a corresponding display of multiple or all sub-sets of cells 312 on the selected level (as compared to screenshot 400 in FIG. 4, which only shows one sub-set of cells 312). Each sub-set of cells 312 illustratively is configured to behave and enable subsequent navigation in a manner similar to that described in relation to the single sub-set of cells 312 shown in screenshot 400 of FIG. 4. Of course, in one embodiment, the system is also configured to enable a transfer from a display of multiple cell 312 sub-sets to a display of a single cell 312 sub-set that looks and behaves similar to the cell 312 sub-set shown in FIG. 4. Again, a mechanism for transitioning back to a previously displayed framework view is likely to be included as a user-selectable option. This could be, but is not limited to, a mechanism similar to that shown in FIG. 6 and/or a mechanism made accessible by way of one of buttons 314-322.

It is worth again emphasizing that the framework display scheme of FIGS. 3/4 can easily be modified to support transitions to a display of multiple sub-sets of cells 312. This may include multiple sub-sets of cells 312 from the same level (e.g., as in the same level from the levels 506-512 of the schematic FIG. 5). In one embodiment of this functionality, selecting an instance of open space 360 (only some examples of such space are identified in FIG. 3) causes a direct transition to a corresponding display of multiple or all sub-sets of cells 312 on the selected level (as compared to screenshot 400 in FIG. 4, which only shows one sub-set of cells 312). Again, a mechanism for transitioning back to a previously displayed framework view is likely to be included as a user-selectable option. This could be but is not limited to a mechanism similar to that shown in FIG. 6 and/or a mechanism made accessible by way of one of buttons 314-322.

Those skilled in the art will appreciate that application 104 is configured to change the size and/or presentation of sets of cells 312, the cells 312 themselves and/or depictions of framework levels (e.g., levels 506-512) as necessary to efficiently utilize available screenshot space in a visually appealing way. For example, the described transition from a display similar to screenshot 700 to a corresponding display of multiple or all sub-sets of cells 312 on a selected level is, in one embodiment, accomplished by terminating the display of the non-selected levels (and associated sub-sets of cells 312) and then expanding the displayed size of the selected level (and associated sub-sets of cells 312) to more efficiently fill available display space. This is not to say that the non-selected levels need necessarily be removed in their entirety. It is within the scope of the present invention for the non-selected levels (and associated sub-sets of cells 312) to be de-emphasized without being removed (e.g., they can be grayed out, be otherwise made inactive, shrunk, moved to a secondary position, etc.). When an indication of the non-selected levels does remain on the display, the selected level may at least be given a more prominent position and/or more prominent display characteristics.

In one embodiment, the display characteristics of a selected level are automatically adjusted so as to make its own included selectable components easier to select in terms of the user dexterity required to accomplish the selection. For example, the size of the touch, click, etc. selection controls area associated with each of the sets of cells 312, the individual cells 312, and/or any selectable empty space are illustratively increased in size in order to make them more easily actuated. The opposite is true when more framework components are added within a given screen shot—sizing is reduced in order to accommodate more information on the screen at the expense of smaller components becoming more difficult to select (or, in one embodiment, even impossible to select without re-sizing).

Up to this point, the re-sizing and re-configuring of displayed framework 164 components and related selection controls has been most often described as being automatically effectuated by application 104 in response to user-initiated navigation transitions between different framework views. In accordance with another aspect of the present invention, the system is configured to support such adjustments in response to reconfiguration commands received from the user. For example, a user is illustratively provided with the ability to use a user input mechanism (e.g., a mouse, touch input, multi-touch input, voice command input, etc.) to communicate commands that cause displayed components of the framework to be rotated, re-sized and/or re-positioned. It is also within the scope of the present invention for the system to automatically or in response to input (e.g., user input) change the perspective of a cell, group of cells, multiple groups of cells, etc. For example, but not by limitation, the depiction of cells 312 shown in FIG. 4 can be modified from the shown two dimensional depiction to a three dimensional representation or a perspective view similar to the perspective utilized to show the various framework levels shown in FIG. 7.

Screenshot 700 is illustratively configured such that the user can, utilizing a user input device to communicate user input commands, manipulate the depictions of any of the framework levels 506-512 along with their associated sets of sells 312. In one embodiment, any of the level depictions can individually or collectively be increased or decreased in size. For example, this could be accomplished by way of a touch-input gesture involving a spreading apart or moving together of two distinct touches (i.e., moving fingers apart or together in a manner similar to that currently used in the art to re-size photographs, etc.). When the level depiction is re-sized the associated cells 312 and/or related selection input control mechanisms are also re-sized, as was previously described. Further, any of the level depictions can individually or collectively be rotated (e.g., tipped forward, backward, or side-to-side) in terms of the perspective of their 3D appearance. Still further, the level depictions can be re-arranged, for example, through utilization of a "select-and-drag" functionality, as is known in the art. In one embodiment, the user interfaces include a mechanism that enables the user to return components they have moved and/or resized back to a default configuration for the currently displayed components of the framework.

In another embodiment, the system is configured to make adjustments automatically in response to reconfiguration commands directed by the user at a particular cell 312 or collection of cells 312. Referring to FIG. 3, the display is illustratively configured to allocate an amount of space given to one or more of the displayed cells 312 in response to a user-initiated input causing a re-sizing of one or more cells 312. For example, space on side 308 is illustratively increased (and likely the size of cells 312 and associated input control mechanism) when the space on side 312 is decreased. In other example, a single cell 312 that is re-sized by a user causes other cells 312 to resize (both their actual size and the size of their associated input control mechanism). Referring to FIG. 7, a user-initiated reconfiguration of one of the collections of cells 312 illustratively triggers an automatic accommodating reconfiguration of other displayed framework components. This system managed reconfiguration can be for the purpose of maximizing the efficiency with which display space is used, to automatically maintain a logical display of information, or any other controlling principle as desired by an involved system developer and/or administrator.

Up to this point, discussion has for the most part been focused upon broad characteristics of the VisualY model framework 164 and user-driven navigation through various components of it. What has not been discussed is any particular ontological scheme for organizing the components of the framework. In that regard, it is certainly true that the scope of the present invention is not limited to any one particular scheme. However, at least for the purpose of being complete in terms of the depth of the present description, examples of particular schemes will now be provided.

In one embodiment, each different cell 312 (loosely represented in FIG. 5 by corresponding model segments 502) represents a different segment or category of subject matter. An identifier or identifiers (e.g., but not necessarily a symbol or symbols, a color, a sound, an animation, etc.) may be included within a cell 312 as an indication of the nature of the subject matter relevant to the cell and/or the nature of the subject matter relevant to other cells 312 navigationally connected to the cell, such as but not limited to a collection of cells 312 in the next adjacent hierarchical level of the framework. In accordance with one aspect of the present invention, the subject matter distribution across all cells 312 included in the model framework 164 is consistent with an overall objective of organizing and presenting enough subject matter cells 312 to intuitively present a relatively comprehensive and well organized presentation of a broad range of various forms of existence. This is not to say that all manifestations of a model framework 164 must have this objective. Other framework manifestations could be narrower or even broader in scope. But at least for the purpose of providing a particularly useful example, the broad range of forms of existence will be assumed. This model framework scheme is particularly well suited for the dynamic, interactive, visual and auditory nature of VisualY representations included in instantiations of the VisualY language. The scheme is especially suitable for such purposes because it provides abundant opportunities for showing connections and relationships between various forms of existence.

A good place to begin a description of the exemplary "forms of existence" model framework is to take a more detailed look at the level of the model framework 164 shown in FIG. 3. The exemplary framework level shown in this screen shot is illustratively the main screen of a human centric view of the "forms of existence" framework scheme. The circled "Y" area 326 is illustratively the human focus of the model framework. As will be described below in greater detail, a user has the option (e.g., accessible by way of one of buttons 314-322) to change to a view other than the human centric view (or to a different variation of a human centric view) and thereby change the presentation and organization of cells 312 on any or all levels of the model framework 164. However, the view shown in FIG. 4 is illustratively the primary human centric view.

The cells 312 on the right-hand side of line 306 in area 310 illustratively pertain to fundamental matter/energy/universe categories of subject matter. There are six vertical rectangles, each containing an indication (in this case a symbol or symbols) of the subject matter of the rectangle and/or of sub-cells 312 included in an adjacent (e.g., connected by way of a direct navigation path) but different collection of cells 312, as was described above. Those skilled in the art will appreciate that any of the vertical rectangles are configured to support, as has been described herein, automatic or user initiated re-sizing. In one embodiment, the system is configured such that a user can communicate a re-sizing input (e.g., but not limited to, a two finger, multi-touch pinching open or shut similar to how photographs are currently known to be re-sized) that causes one or more of the rectangles to be increased or decreased in size. It is within the scope of the present invention for any or all cells 312 (i.e., any of the selectable segments on either side of line 306) to be automatically re-sized or re-sized in response to user input.

In one embodiment, the system is configured such that the number of indications sub-cells 312 included in a given rectangle or any of the selectable segments on either side of line 306 may change in correspondence with its re-sizing. For example, if the rectangle or another segment is made large enough, symbols representing cells 312 from multiple cell collections on the same or different framework levels may pop up. The larger the rectangle, the more detail that pops into the rectangle to indicate what other sub-cells or related cells are accessible by way of navigations through the rectangle. In one embodiment, this re-sizing functionality is incorporated into any or all of the framework areas described herein. For example, the cell collection shown in FIG. 4 can illustratively be similarly resized automatically or in response to user input so as to change the level of detail presented in terms of what cell collections are accessible through the depicted framework component. Similarly, any of the squares, rectangles, triangles and other shapes within the FIG. 3 depiction can be similarly resized. The system is illustratively configured to automatically reorganize a depicted framework representation so as to optimize the use of space and to make the depiction visually appealing and logical, and to present selectable components as easy to select as possible. In one embodiment, this means shrinking, re-representing (e.g., shown as minimized), or deleting one or more framework areas as another framework is increased in size. Or, framework areas can be enlarged, re-represented or re-rendered as another framework area is decreased in size.

In one embodiment, when an area is made large enough, it will eventually sweep in not just the directly accessible adjacent framework levels and cell clusters but also levels and clusters connected beyond the directly accessible. This illustratively means a depiction within an enlarged framework area that distinguishes between those framework levels and/or cells that are directly accessible and those that are not. In one embodiment, not by limitation, this depiction is a representation of a hierarchy such as a tree diagram.

In one embodiment, changes other than re-sizing are also supported. For example, a framework area or a collection of cells 312 can illustratively be removed or minimized. Similar to how a user of the modern Microsoft Windows operating system is able to minimize a desktop window in order to open up desktop space, a user of the presently described application (or an automated system function), can illustratively minimize one or more portions of the framework 164. Or, similar to how a user of Windows is able to "x out" of an application or window, a user of the presently described application (or an automated system function), can close one or portion portions of the framework 164. In one embodiment, a "return to default" function is provided to the user as a mechanism for easily undoing adjustments the user has made and returning all or a portion of the framework 164 to a default state.

Returning again to the description of the exemplary ontological aspects of the "forms of existence" framework scheme, the six rectangles in area 310 illustratively represent six broad categories of fundamental matter/energy/universe subject matter. The six categories are organized so as to present, to some extent, a right-to-left spectrum of fundamental matter/energy/universe building blocks of which most forms of existence are comprised. The spectrum is illustratively organized such that items classified further to the right are generally more foundational and small while items classified further to the left are generally more complex. The spectrum therefore becomes more complex as it gets closer to the human area 326, which is consistent with the fact that humans are often understood to represent one of the most complex forms of existence. Category segments on the left of line 306 in area 308 are generally human-oriented while category segments on the right of line 306 in area 310 are generally not human-oriented except to the extent that they are building blocks of human-oriented concepts.

In one embodiment, the six categories of subject matter (each represented by a separate one of the rectangles in area 310) included in the spectrum, along with exemplary sub-categories (e.g., the sub-categories reflected in associated navigationally accessible hierarchical constructs) are:

1) Primary building blocks (rectangle furthest to right)
    sub-cells include: fundamental building block components such as but not limited to light, gravity, sub-atoms, energies, forces, etc.
2) Vertical periodic table (rectangle 2nd from the right)
    sub-cells include: groupings of elements based upon any factor such as but not necessarily limited to function, reactivity, weight, toxicity, value, etc.
3) Non-generative items formed of periodic table components (rectangle 3rd from right)
    non-generative in the sense that there is generally no contribution to life forms
    sub-cells include: groupings based on any factor such as but not necessarily limited to compounds, mixtures, etc.
    illustratively sorted from small items up to large items (as large as planets, cosmos, etc. or even larger)
4) Generative things made out of periodic table components (rectangle $4^{th}$ from left)
    generative in the sense that there is contribution to life forms
    illustratively sorted from small items up to large items
5) Microorganisms that utilize or comprise the generative things (rectangle $5^{th}$ from left)
    sub-cells illustratively organized based on size, reactivity (inert or highly reactive thing), etc.
    organisms in this category generally have no brain
    includes access to cells related to environments, etc.
6) Macro organisms that have brain (rectangle $6^{th}$ from left)
    sub-cells include illustratively organized based on size, capacity, functionality, etc. (humans highest)
    includes access to cells related to environments, habitats, etc.
        illustratively includes access to cells related to human built things (cars, compounds, bridges, etc.)

At this point, it is worth noting that mutual exclusivity is not required. For example, a single sub-cell or symbol can be assigned within multiple categories (e.g., can be assigned within more than one "parent" cell 312). If a sub-cell or category seems to fit within multiple of the rectangles in area 310 then it is acceptable for it to appear within multiple of the rectangles. Thus, it stands to reason that a single navigational path can be made accessible from multiple of the rectangles.

Further, these principles of non-exclusivity extend to all components of the model framework 164. A component of one of a rectangle in area 310 could also appear in a cell 312 within area 308 or vice versa if that makes sense in terms of the ontological logic of the framework scheme or, in particular, if that makes sense in terms of the ontological nature of things that exist in the universe. In one embodiment, the goal is to remain as consistent as possible with the actual organization of the universe, which is a complex endeavor that requires the noted flexible approach.

Before proceeding, it is worth digressing for a moment on the role that reality plays within a VisualY representation, the VisualY model framework, or other copmonents or instantiations of the VisualY language. Within application 104, reality is illustratively an adjustable concept. It was stated in the previous paragraph that, in one embodiment, the goal is to remain consistent with the actual organization of the universe. However, in one embodiment, reality is a parameter that may be adjusted programmatically within the software to some extent. In other words, the system provides a function (e.g, made accessible by way of one of buttons 314-322 or otherwise) that enables the user to selectively define variables in relation to a set of rules defined within the software, the set of rules effectively becoming a particular reality that is imposed programmatically on the configuration of the VisualY model framework and/or as appropriate to other VisualY language components. The default state of the system is illustratively the current human understanding of the universe and everything in it, and thus the default goal is to conform the VisualY language components to that interpretation of reality. However, in one embodiment, the user can adjust to a different reality which may be even be an unrealistic or non-existent reality. This may be as simple as adjusting a rule of physics (e.g., eliminating gravity from the universe) or as fantastical as setting the reality to a fictitious place such as a literary location like the Kingdom of Narnia. In one embodiment, when the user manipulates or otherwise leaves the default reality, the user interfaces of application 104 are modified to include a clear indicator of the reality in which the system is set. In one embodiment, a mechanism such as a button is provided in order for the user to quickly return the system to its default reality state. In one embodiment, mechanisms are provided within application 104 to enable a user to create and save new "realities" for later retrieval. For the purposes of the present invention, to the extent that the term "reality" is used in the present description, the term is intended to mean the applicable reality imposed at any given time within application 104.

To the left-hand side of line 306 in area 308, the cells 312 in area 326 are organized around what is herein referred to as a "yperson" construct, signified by the three lines extending from a central circle so as to form a "Y" shape. As has been discussed the view of the "forms of existence" framework reflected in FIG. 3 is human-focused. This view is especially well suited for human cognition at least because humans inherently tend toward a human-centric perspective. However, the model is designed to effectively support VisualY representations of how, given a particular context of interest as selected by the user, the generally human-centric subject matter cells 312 in area 308 directly relate to and are connected to the categories of fundamental matter/energy/universe subject matter cells 312. This is illustratively an instantiation of the VisualY language. Thus, the VisualY language enables a "big picture" dynamic representation of a complex system, the representation being intuitive and capable of showing simultaneous interplay of multiple or even numerous variables at work within the system.

The "Y" in area 326 illustratively divides the "yperson" into multiple cells 312 representing multiple dimensions of the yperson. The cell 312 on the bottom right identified with a 328 designation is illustratively the corporeal dimension. Within FIG. 3, no symbols or sub-cell designations are shown in area 328 but it is assumed that through this particular cell 312 the user can see and access sub-cells representing categories of subject matter consistent with corporeal characteristics of the yperson. For example, the cell identified as 328 can illustratively be expanded (e.g., using a multi-touch "pinch gesture) or navigated to (e.g., navigating to a next level similar to a FIG. 4 next level) in order to see more detail about related sub-cells.

The cell 312 on the top of the "Y" identified with a 330 designation is the consciousness (awareness) dimension. Within FIG. 3, no symbols or sub-cell designations are shown in area 330 but it is assumed that through this particular cell 312 the user can see and access sub-cells representing categories of subject matter consistent with consciousness-oriented characteristics of the yperson. For example, the cell identified as 330 can illustratively be expanded (e.g., using a multi-touch "pinch gesture) or navigated to (e.g., navigating to a next level similar to a FIG. 4 next level) in order to see more detail about related sub-cells.

The cell 312 on the bottom left of the "Y" identified with a 332 designation is the sub-consciousness-oriented dimension. This dimension illustratively encompasses inherent motivations that drive humans. For example, a human may not know what they are about to say until they say it. It is a sub-conscious mechanism that affects what is said. This is but one example. Within FIG. 3, no symbols or sub-cell designations are shown in area 332 but it is assumed that through this particular cell 312 the user can see and access sub-cells representing categories of subject matter consistent with sub-consciousness-oriented characteristics of the yperson. For example, the cell identified as 332 can illustratively be expanded (e.g., using a multi-touch "pinch gesture) or navigated to (e.g., navigating to a next level similar to a FIG. 4 next level) in order to see more detail about related sub-cells.

The cells 312 in the small corners 362 around the "Y" illustratively represent the yperson's applicable environments. Within FIG. 3, no symbols or sub-cell designations are shown in corners 362 but it is assumed that through these particular cells 312 the user can see and access sub-cells representing categories of subject matter consistent with environmental considerations relative to the yperson. For example, the corner 362 cells can illustratively be expanded (e.g., using a multi-touch "pinch gesture) or navigated to (e.g., navigating to a next level similar to a FIG. 4 next level) in order to see more detail about related sub-cells. In one embodiment, each of the corners 362 (and associated sub-cells 312, etc) represents a different "level" of environmental considerations, illustratively on a spectrum from micro to macro (e.g., from the micro environment to macro environment).

Above the yperson area 326 are a plurality of horizontal rectangles in a non-tangible human construct area 340. Each rectangle in area 340 is illustratively a different cell 312, although only a representative few have been labeled in the FIG. 3. The cells 312 in area 340 illustratively represent, within the model framework, non-tangible "things" created by humans. For example, it is through a cell 312 that the user might access a cell 312 representing the culture of a particular city (e.g., but not necessarily depending upon user-selected application preferences, the culture of the city where the currently selected ypserson(s) live). Other cells also lead to cells 312 that represent how people think (e.g., but not necessarily depending upon user-selected application preferences where the currently selected yperson(s) lives). Other examples include what is believed, how the yperson(s) have organized (institutions, etc.), normals, rules, laws, governments, etc. Of course, these are only examples and the scope of the present invention is certainly not so limited.

Notably, the rectangles in area 340, which generally represent non-tangible things, are horizontally oriented. In contrast, the rectangles in area 310, which generally represent tangible things, are vertically oriented. In one embodiment, this theme is carried throughout the application interfaces. In one embodiment, a rectangle oriented at an angle represents something where the tangible/non-tangible line is ambiguous or not clear.

To the left of the yperson area 326 are a plurality of circles in a people area 364. Each circle in area 364 is illustratively (though not necessarily) a different cell 312, although only a representative few have been labeled in the FIG. 3. The cells 312 in area 364 illustratively represent, within the model framework, people having a relationship to the yperson, or at least having interaction on some level with the yperson. Each circle illustratively represents one person or a group of persons. The representation may be very specific (e.g., a circle representing single specific person such as President Bill Clinton) or may be collective or otherwise generic (e.g., a circle representing farmers from Kansas). Some cell 312 circles included in or accessed through area 364 (e.g., sub-cells 312 made accessible by way of navigation through area 364 cells) will represent individual humans (e.g., Paul Johnson from Toledo, or a postman, etc.) and others will represent groupings of humans (Boy Scout troop 345 from Toledo, or communists, etc.).

Those skilled in the art will appreciate that just as the system is configured to enable the user to navigate through the rectangles in area 310 (or through any other cell 312 clusters in the model framework), so too can the user navigate through the circles in area 364, for example to other circles or even to portions of the model framework outside of area 364 if logically appropriate. It is therefore to be understood that all of embodiments described herein at least in terms of the use of symbols, navigation methods and the like described in the context of other cells and cell clusters in the model framework are just as applicable to the circles in area 364. Still further, just as vertical rectangles and horizontal rectangles used within the model framework signal relevance to a particular area within the ontology of the model framework, so too does the use of circles illustratively signal a connection to a people-oriented relationship to the yperson.

It is within the scope of the present invention for a circle or circles within the model framework to represent living people or dead people. Circles may represent people that exist or people that do not exist or never have existed (e.g., fictional people). They may represent people from the past, present or future. Further, the term "people" should be liberally construed. Circles may also represent cartoon characters (e.g., Scooby Doo), animals (e.g., a favorite pet), or any other person, place or thing that has the capacity to function in a manner similar to a person in terms of their interaction with, or relationship to, the yperson. By not strictly requiring a circle to represent a living human, the system is flexible enough to accurately reflect the reality (the reader should be reminded that, as state above, reality is a programmatically adjustable concept within application 104) of even an unusual set of circumstances. Further, as has been described, the system is also flexible enough to allow an entity represented by a circle to also be represented elsewhere in the model framework. The goal is, in one embodiment, to configure the ontology of the model framework so as to accurately reflect reality (the reader should be reminded that, as state above, reality is a programmatically adjustable concept within application 104). Thus it is undesirable to impose rules that might simplify the model framework at the expense of departing from reality.

In one embodiment, the configuration and organization of the cells 312 in area 364 may be but illustratively is not random or arbitrary. Instead, the configuration and organization of the circles in terms of their placement relative to each other, their placement relative to the top or sides of area 364, their placement relative to yperson area 326, their motion, their color, their associated sounds, their size, or any other adjustable parameter is indicative of a characteristic of a relationship or level of interactions with the yperson. For example, in one embodiment, the directness of an interaction is factored into the scheme utilized to organize the cell 312 circles. Humans with the most direct interaction are illustratively touching or at least closest to yperson area 326.

In another embodiment, the depiction scheme of circles within the model framework includes a mechanism for indicating whether an exchange with the yperson is direct or indirect. For example, an exchange mediated through another entity is illustratively accounted for in the depiction scheme. In one embodiment, assuming such a scenario is consistent with reality (the reader should be reminded that, as state above, reality is a programmatically adjustable concept within application 104), a mediated exchange may even be made shown in relation to a circle representing someone no longer living. For example, if a now dead person that never met the yperson made music years ago that is listened to by the yperson that can be considered a mediated exchange and is illustratively shown as such within the model framework. In one embodiment, mediated exchanges are indicated by utilization of a slightly different shape (e.g., an oval instead of a circle), color, sound, placement, etc. Further, less direct exchanges (such as but not limited to mediated exchanges) are illustratively assigned relatively smaller cells 312 and/or are positioned further away from the yperson within the model framework. Of course, these are only examples and the scope of the present invention is certainly not so limited.

Below the Y area 326 is an area 366 dedicated to depicting an applicable spatial action or otherwise a context for an active VisualY representation. In other words, area 366 provides a way to show an accurate context over space and/or time for the currently active VisualY representation. For example, a video of a person jumping out of a plane may be shown in area 366 while, as part of an applicable instantiation of the VisualY language, many cells 312 throughout the VisualY framework light up, change color, move, generate sound, become associated with an animation or symbol, and otherwise show, on the potentially many relevant levels of the framework, what is happening to the yperson while they are jumping. Of course, this is but one of an unlimited number of examples of how area 366 is utilized to indicate a context for activity (e.g., sounds, coloration, changes in sound, changes in color, animations, etc) occurring in relation to cells 312 in the framework 164.

In one embodiment, the context provided in area 366 is active so as to depict a dynamic context for changes occurring relative to the framework as part of a VisualY representation. Thus, the provided context can be a video, or an animation, or a series of photos, or an arrow or other pointer moving across any of a variety of different types of timelines (e.g., a human development timeline, a date-oriented timeline, or a timeline organized around any other concept). Alternatively, the context provided in area 366 can be static such as a picture or a map. The context provided in area 366 may be made in terms of the places or events in the past, present or future. It can be a depiction of events that did already occur, events that have never occurred, events that will but have not yet occurred, events that will never occur, or otherwise. The context may be presented in terms of real places or places that do not exist in the "real" world, or even fictitious places. Or, it can be an event such as World War II or Super Bowl VII. It is within the scope of the present invention for the context provided in area 366 to be absolutely any mechanism for depicting a space, time, subject matter or any other context for what is being represented in relative to the framework 164 as part of an active instantiation of the VisualY language (i.e., an active VisualY representation).

In accordance with another aspect of the present invention, just like other cell 312 areas within the framework are configured to support navigation to other levels of detail by navigating to other cell 312 areas, so too may area 366 be configured to support navigation to other levels of detail. In one embodiment, the system is configured to enable a user to choose from a variety of different perspectives of the same context for a VisualY representation. For example, the user might navigate from a pulled back video view of a person sitting on a bench eating corn to a close-up video view of the person's jaw chewing corn. In one embodiment, the system illustratively includes mechanisms for slowing down (e.g., slow motion), speeding up, re-starting, rewinding, pausing, or otherwise manipulating a video or animated area 366 context, thereby illustratively causing a corresponding (e.g., slowing down, speeding, pausing, rewinding, etc.) change to the current dynamic VisualY representation. These are but examples of how the area 366 area context can be selectively adjusted without actually changing the active VisualY representation.

However, it is also within the scope of the present invention for the system to be configured to utilize navigation of area 366 (or similar functionality accessed elsewhere within the system such as through functions associated with one of buttons 314-322) as a mechanism that enables the user to switch from one context for an active VisualY representation to a different context for the VisualY representation, thereby effectively transitioning from one VisualY representation to another. For example, the context area 366 might be changed from one person eating corn in a "right now" sense to a specific infant child eating corn for every meal for a month. This would not only change the context for the currently active VisualY representation but would also change the VisualY representation itself (e.g., it would change the yperson area 326 from the one person yperson focus to the infant child focus, along with the many other likely changes to the VisualY representation in relation to model 164 that that would produce).

When the context area 366 is navigable and/or alterable, the system illustratively provides an indication such as a symbol, color or sound to indicate navigability. In one embodiment, area 366 is navigable and otherwise can be manipulated in at least all of the same ways described herein in relation to cells 312 included within the framework 164. For example, different context options might be accessible through area 366 in the form of cells 312 made accessible through area 366. In one embodiment, one or more cells (even potentially multiple cells simultaneously) accessed through area 366 can be selected so as to set the active context for the currently active VisualY representation.

In one embodiment, any or all of the cells 312 in framework 164 can be made selectable such that, when selected by the user, corresponding changes are instantly made to the currently active VisualY representation. Thus, the user is illustratively able to navigate throughout the framework selecting and/or deselecting cells 312 as desired and thereby configuring the currently active VisualY representation as desired. In one embodiment, the user can start an active space/time video context in area 366 at the beginning of a video that is the context for a first VisualY representation that is made while the video is playing. Then, the user can pause the video while navigating through model 164 and making changes by selecting and de-selecting cells 312. Then, the user can manipulate a control provided within the system in order to re-start the video. An updated VisualY representation will then be shown in relation to the re-started video, the representation being updated due to the new set of variables applied to the representation by way of the new combination of selected and de-selected cells 312. In other words, the behavior of the VisualY representation (e.g., colors, sounds, animations, motions, etc. shown in relation to the framework 164) is programmatically dependent upon system variables as selectively set by the user of the application. In one embodiment, the behavior of the VisualY representation is also programmatically dependent upon which view of all or a portion of the framework 164 the user has selected.

4. The VisualY Engine

As should be becoming apparent, application 104 is configured to provide a richly dynamic and programmatically responsive user experience in the form of instantiations of the VisualY language. A given instantiation is likely to include a VisualY representation of information, which illustratively includes sound, color, multimedia, motion (or any other similar means for conveying information) provided in relation to any or all of the components of the VisualY framework. As the user navigates through the framework, as the user selects and/or deselects components of the frameworks, and as the user changes views of all or portions of the framework, the relevant VisualY representations (i.e., color, sound, multimedia, motion, etc.) are configured to programmatically respond and be presented to the user in a way that communicates knowledge and information in the context of the currently presented VisualY framework components. It should also be noted that, in one embodiment, other programmatic variables may come into play, such as other user-selected parameters (e.g., in one embodiment, the user selects a purpose for their current exploration of the VisualY instatiation) that will impact how the framework and/or representation responds programmatically.

In accordance with one aspect of the present invention, the application 104 component that drives the dynamic responsiveness of instantiations of the VisualY language is a VisualY engine 170, which is shown in FIG. 2. It is a misnomer of sorts to refer to engine 170 as a single component because, in implementation, it is likely comprised of a variety of different hardware and software sub-components.

Engine 170 includes, in one embodiment, front end software components that drive the front end of application 104. For example, the front end components determine the user experience in terms of the sounds, images, multi-media, content, functions, controls and tools presented to a given user automatically, semi-automatically or in response to user input or otherwise. In one embodiment, the front end components include primarily JavaScript coded components that communicate with backend system components responsible for actually retrieving information from the database(s) as necessary to appropriately fulfill a frontend requirement.

In one embodiment, the front end software components of engine 170 include WebGL programmed components that extend the capability of the JavaScript programming language so as to enable engine 170 to generate interactive application 104 graphics (e.g., interactive 3D graphics) within the browser of users of the application. This WebGL code illustratively executes on the computer display cards of the users. Those skilled in the art will appreciate that WebGL is a context of the canvas HTML element and, accordingly, components of the front end software components of engine 170 are coded in accordance with canvas programming constructs.

In one embodiment, the front end software components include audio API components that extend the capability of the JavaScript programming language so as to enable engine 170 to dynamically generate interactive application 104 audio in logical relation to visual information presented through the user's browser. The audio API components enable manipulations (changes in pitch, tempo, etc.) of audio signals on the sound cards of the users. Accordingly, in one embodiment, the audio is synthesized and processed directly in JavaScript without use of a plug-in. In one embodiment, audio is managed through the AudioData API (Mozila Firefix) and/or the WebAudio API (Chrome and Sarari) thereby enabling audio information to be manipulated more directly or at least relatively more directly upon the user's hardware responsible for audio data management.

In one embodiment, certain of the front end software components, including the components for managing audio and video features presented to an application user, are coded so as to be conditional in the sense of being rules based but are not so conditional as to require coded anticipation of every possible outcome. The described JavaScript API's are illustratively applied within the engine 170 framework so as to enable a user of application 104 to manipulate variables (e.g., manipulate manifestations of the VisualY language by selecting de-selecting, or navigating through sets of cells 312) that affect in essentially real time what is presented to them in terms of their audio and visual application experience. The JavaScript API's enable this to be accomplished without working through a browser plug-in such as a Flash plug-in. By enabling the audio and visual experience to be efficiently managed and manipulated by the user's own audio and video hardware, the JavaScript API's enable the front end components to provide what is essentially a generative user experience. In one embodiment, the JavaScript API's are utilized within the front end software components so as to provide a visual and/or an audio user experience powered by some degree of programmatic artificial intelligence (or at least an allusion from the user's perspective of artificial intelligence) instead of a strictly rules based logical approach. Thus, not every possible outcome (e.g., not every possible combination of activated or deactivated cells 312) need be programmatically accounted for per se in order for there to be a logical (at least from the user's perspective) manipulation of the user experience.

It should be said that these generative components of driver 170 may still technically be conditional in terms of their logic but they also sometimes will programmatically accommodate complexity or chaos to some degree. In one embodiment, the algorithms utilized to drive the experience of a user of application 104 facilitate production of user experiential outcomes that were not strictly programmatically anticipated when the code was originally developed. In another embodiment, the system is programmed to have an ability to "learn" that is implemented through a variety of artificial intelligence algorithms and techniques. Then, an outcome that is learned may illustratively be re-created differently under a same or similar set of conditions subsequently established by the user through manipulations made during interaction with the application 104.

To summarize, the experience of the user of application 104 as facilitated by engine 170 is interesting in terms of how it is delivered through the user's web browser on a user-driven basis (i.e., responsive to user adjustment of application variables) so as to be dynamically generative and responsive thanks at least in part to direct generation and/or manipulation of audio and/or visual data upon (or at least in a close direct relationship with) the user's audio and video hardware. This is illustratively accomplished without reliance upon functionality delivered by way of a web browser plug-in (e.g., a Flash plug-in) or some other similarly delivered additional functionality. While the scope of the present invention does not exclude a plug-in driven implementation such as a Flash-based implementation, such a solution is assumed to be less desirable, for example, because the graphics throughput is considerably less and there will generally be limited or no graphics shading options. The options for presenting representations of information-rich, dynamic complex systems, and for enabling multiple people in remote locations to collaborate in real time in the continuous development of such representations, are far greater and more flexible utilizing the non-plug-in implementations described herein than the plug-in driven solutions that, at the time of this writing, currently are the dominate choice by far for navigating the more dynamic and "alive" sites on the world wide web and on other similar informational networks.

It is worth elaborating some on the collaboration aspect of embodiments of the present invention. The experience of the user of application 104 as facilitated by engine 170 illustratively revolves around a community that collaborates essentially in real time. Engine 170 is configured to enable the users of application 104 to collectively and remotely create, organize, collect, modify, transform, present, navigate, browse, search, experience, display, store, retrieve, transfer, and otherwise interact with instantiations of the VisualY language. In one embodiment, the VisualY representations 162 (e.g., presented to a user in the context of all or a portion of the VisualY model framework 164) are made available on the World Wide Web such that the described and other functions of engine 170 are made publically available to some extent.

Accordingly, embodiments of the present invention pertain to applications of relatively new browser technology that enable relatively large graphics (and audio) throughput. The system enables a connection of easy to use and flexible programming code to an especially efficient pipeline to a user's hardware where it is quickly executed. This direct pipeline scheme enables much more throughput than a traditional approach where code is first move around and processed through higher levels within the computing architecture. For example, the direct pipeline approach enables the skipping of more traditional steps such as setting up up binary and library resource requirements, compiling to binary, fixing cross operating system parameters, etc. The described browser-driven but not plug-in driven programmatic approaches (such as WebGL) are essentially pathways to getting code directly onto hardware, thereby makig it much faster to execute. This technology is directly responsible, in accordance with one aspect of the present invention, for empowering the user community to directly or indirectly participate in a collaborative effort to manipulate the code (e.g., manipulate instantiations of the VisualY language) and save progress as such manipulations are made. The users thereby gain from each other as value (i.e., in the form of information and knowledge communicated in accordance with the constructs of the VisualY language) is added and modified on a collaborative basis. And this is still done utilizing a browser driven remote application approach rather than another approach, for example, requiring each user to obtain a stand along application.

In one embodiment, the VisualY language includes a code based framework with styling principles, macro functionality for task accomplishment, web failbacks for cross browser support, etch. The engine 170 illustratively utilizes these and other components of the VisualY library and framework. The engine is an instantiation of code that illustratively comes from the VisualY library and framework. Thus, it can be difficult to draw exactly the line between the language and the engine. However, exactly where this line lies is not necessarily critical to the present invention.

Figure 8:
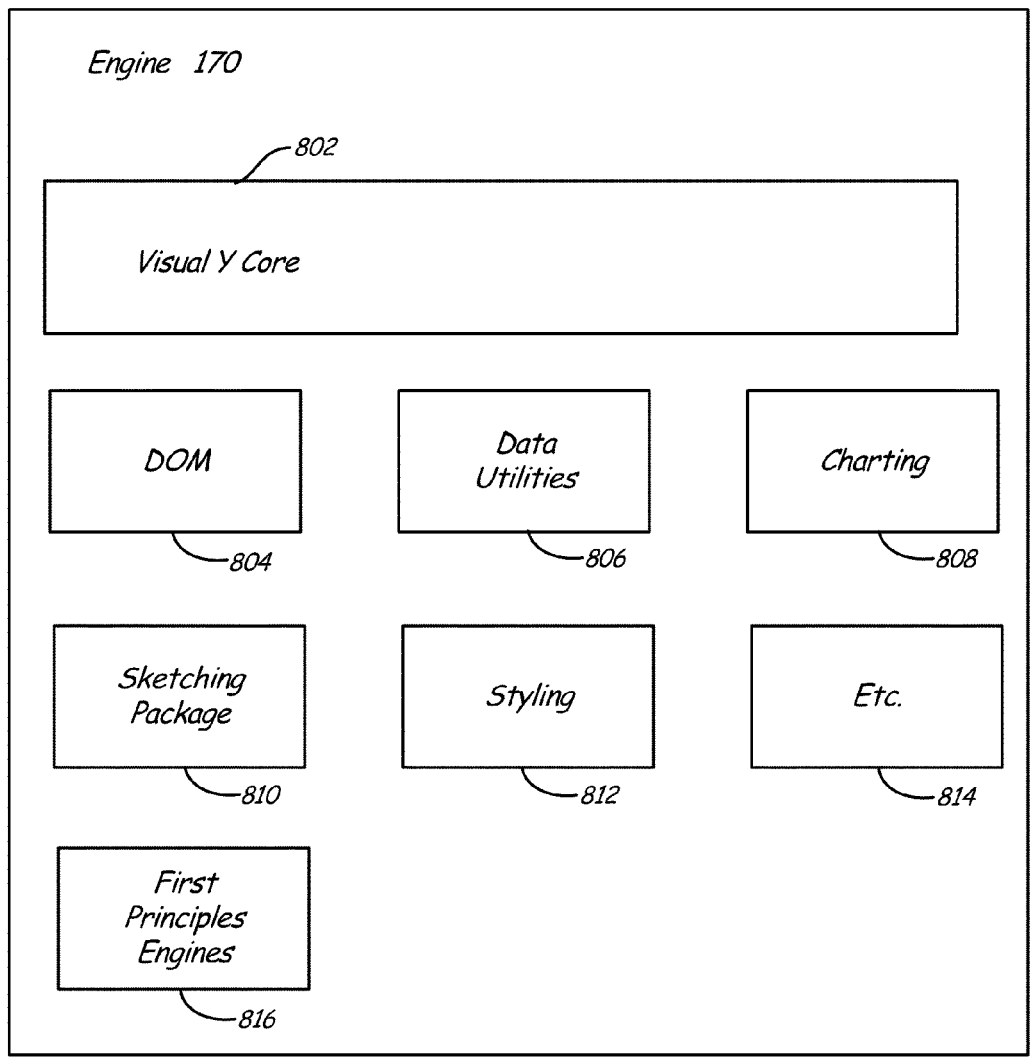
FIG. 8 is a block diagram showing an engine.

FIG. 8 is a block diagram showing, in accordance with illustratively embodiments of the present invention, components of engine 170. Engine 170 is illustratively an instantiation of VisualY core components 802. In essence, engine 170 is the driver and has its hands in (and relies upon) the functionality of the core components 802. In one embodiment, core components 802 provide the visual language manifested as JavaScript (though the scope of the present invention is not so limited). These components are illustratively the API's of the application 104 system and therefore define the basic application components.

Included under the core components 802 are DOM (document object model) utilities 804. This is illustratively where information is provided for manipulating the page structure within application 104. These components are illustratively coded as CSS3 and/or HTML5 constructs, though the scope of the present invention is not so limited. Also included are data utilities 806, where functionality is provided for manipulating data that is to be presented within application 104.

Also included under the core components 802 are charting components 808. The charting components illustratively include, but not by limitation, weighted stacks, bar charts, model handling functions, etc. This may or may not be where rendering is handled but is illustratively an area where instructions are recorded to define how things are drawn. A separate sketching package 810 provides functions that make it possible to draw on a very efficient basis, as has been described in relation to the incorporation of WebGL and Canvas mechanisms into the application architecture. A set of styling components 812 define available colors, line thicknesses, etc. Those skilled in the art will appreciate that the description of components of engine 170 described herein is not exhaustive and that other components are likely to be included at least to supply basic functions that are known in the art to be part of the kind of network driven application architecture described herein. For this reason, a catch-all box 814 is included in the FIG. 8 depiction of engine 170.

5. First Principles Engines

In relation to the VisualY model 164 it was explained that cells 312 within the model framework need not be exclusive in order to enable an accurate, scientifically founded presentation of information and knowledge. This is almost certainly true of the cells 312 in area 326 where interplay between the different dimensions of the yperson are likely to be common. For example, the line between conscious processes and subconscious process is not necessarily going to be clear. In order to maintain the integrity of the ontological classification scheme, it will sometimes make sense for there to be some level of redundancy in terms of the components of one cell 312 relative to another.

As much as possible, this interplay and overlap within the model framework 164 is preferably managed not on an arbitrary or opinionated but instead is managed so as to remain as consistent as possible with the interplay and overlap of corresponding processes that exist in reality. In other words, as the model framework grows and evolves, it is illustratively the goal to stay as consistent as possible with the way in which humans, nature and other manifestations of existence are actually programmed. For example, if a human wants to control something, then an awareness of the thing to be controlled must first be created. Humans generally have some degree of control in terms of their view of what is really happening within their surroundings. So, the line between the conscious and sub-conscious is not necessarily always clear. By not requiring a given cell 312 construct to be assigned exclusively to a single location within the model framework 164, there is allowance for enough flexibility to address mysteries or ambiguities or complexities in terms of the underlying programming and processes that drive reality (the reader should be reminded that, as state above, reality is a programmatically adjustable concept within application 104).

The goal of reflecting and representing real underlying fundamental programming and processes is not exclusive to the human context of the model framework. As is likely becoming apparent, the VisualY model framework is intended to encompass all levels of existence, from the smallest building blocks to the largest most complex constructs. In reality (in particular the default reality of the universe discussed above in the context of programmatically adjusting reality within application 104), every manifestation of existence is subject to some degree of inherent fundamental programming that dictates, to some extent, interactions among and between the constructs represented within the model framework. By not requiring a given cell 312 construct to be assigned exclusively to a single location within the model framework, there is allowance for enough flexibility to address mysteries or ambiguities or complexities in terms of the underlying programming and processes that drive reality (though the reader should be reminded that, as state above, reality is a programmatically adjustable concept within application 104).

In accordance with one aspect of the present invention, first principles engines 816, which are shown in FIG. 8 as part of the larger engine 170, function within the application 104 framework as the mechanism for enforcing restrictions and requirements relative to the VisualY model framework and related VisualY representations (i.e., instantiations of the VisualY language) based on scientific, nature, and/or other fundamental principles. For example, the principles upon which the restrictions and requirements are based are illustratively first principles. A first principle is, in a philosophical sense, a basic foundational proposition or assumption that cannot be deduced from any other proposition or assumption. To the extent that new first principles are discovered or existing first principles are abandoned or changed, corresponding changes can be made (for example, by an administrator of application 104) to the engines 816 in order to keep, as much as possible, a given VisualY instantiation consistent with a fundamentally accurate portrayal of all levels of existence.

In one embodiment, engine 816 will, on the basis of maintaining alignment with a first principles or other principle accounted for in engine 816, require or refuse a cell 312, a link between cells 312, a color designation, an animation, ect. Thus, engines 816 are utilized within application 104 to enforce alignment with a set of bases principles by policing, to some extent, interactions among and between the constructs represented within the VisualY model framework.

In reality, everything (i.e., all things at all levels of existence) is in a constant state of change. Consistent with this premise, instantiations of the VisualY language provides a visual (and sometimes audial) representation of all constructs of existence and the VisualY programming and language provides the tools for showing the constant change and interactions among the constructs of existence. And a fundamental assumption underlying this approach is that everything in existence is in a constant state of change and everything in existence is, to some extent, subject to some degree of fundamental programming that drives the change and therefore directly influences interactions at all levels of existence.

Thus, when the mechanisms of VisualY are applied within a given context to model framework 164, it becomes possible to explicitly depict human programming and interactions among the various dimensions of the yperson (i.e., the "person" reflected in area 326). In one embodiment, the application includes a function (e.g., a function accessed by way of one of buttons 314-322, or by navigating through the constructs 312 of the model framework and selecting a cell 312 or setting parameters in relation to a cell 312) that enables a user to select a time independent or time dependent context to be imposed upon the VisualY representations of interactions and programming displayed in relation to the model framework. For example, the user can set the display to show what is happening now, what happened during a point in history (a specific date or a range of time, etc.), or what will happen in the future. However, selecting a time context is not limited to units of time as measured in relation to a clock or calendar. The user can illustratively choose any measure of time such as an historical event (e.g., during World War II), a human event (e.g., during birth, during the yperson's second decade of life, after the yperson eats, after the yperson plays football for 10 years, etc.), or even a theoretical event that is not consistent with reality (e.g., after the yperson eats corn, or after the yperson gets a concussion, etc.).

As is apparent in some of these examples, the application is illustratively configured to enable a user to select and/or set any of what is likely to be an abundant number of parameters that have the potential to impact the VisualY representations of interactions and programming displayed in relation to the model framework. While these parameters may be set by way of functions accessed by way of one of buttons 314-322, it is more likely that such parameters will be set by navigating through the constructs 312 of the model framework and simply selecting a cell 312 or setting parameters in relation to a cell 312. The functions that dictate how different parameters will affect the model framework and/or the VisualY representations (e.g., how interactions between model framework constructs 312 are shown using the mechanisms of the VisualY programming and language) is illustratively built into the computer code underlying the framework and/or the mechanisms of the VisualY programming and languge.

Accordingly, the model framework 164 and the mechanisms of the VisualY programming and language combine to make it possible, for example, to depict what gets into the memory of the yperson (i.e., knowledge). And this can be seen at different levels and with connections to other dimensions of the yperson and with connections to other constructs outside of the human realm (e.g., with connections to constructs included in the subject matter categories of the cells 312 on side 310 of line 306). Further, it is also possible to depict, for example, specific types of trama within appropriate cell 312 dimensions of the yperson and with explicit and appropriate connections to other cells 312 on any level of the model framework 164.

In one embodiment, the system enables the user to set a particular yperson context for area 326. This may be accomplished through interaction with a function accessed by way of buttons 314-322. Also or alternatively, setting the yperson context may be accomplished by navigating through the constructs 312 of the model framework and selecting a cell 312 or setting parameters in relation to a cell 312. The yperson context can illustratively be set to represent a specific person or a generic human being or a group of human beings (e.g., a company of individuals, an organization of individuals, etc.). When the ypserson context is changed, the rest of the model framework 164 and its related VisualY programming illustratively updates automatically in order to modify the representation of complexity so as to be consistent with the selected yperson focus.

In one embodiment, which is visually depicted in FIG. 3 by the overlapping circle 334, the yperson focus of the representation can be a group of persons each having their own yperson representation. The system is illustratively configured to enable the user to selectively add or remove ypersons to the "stack" of "Y" people in area 326. As users are added or removed, the rest of the model framework 164 and its related VisualY programming will illustratively update automatically in order to modify the representation of complexity so as to be consistent with the selected yperson focus. Thus, depending upon the selected settings in area 326, the system is design to account for and represent information in relation to collective (i.e., across a group) human dimensions (e.g., collective consciousness, sub-consciousness, etc.). Similar to the described functionality described above in relation to a single yperson context, the mechanisms of the VisualY programming then trigger representations of connections between the human-oriented cells 312 on side 308 of line 306 and the other more foundational cells 312 on side 310 of line 306.

In one embodiment, the yperson focus in area 326 indicates a group of different individuals the application can be set to only conform the representation to one of the individuals at a time. For example, the user can illustratively see layers if individuals represented in the rings within area 326 (e.g., the top-most yperson representation is illustratively rendered semi-transparent so other y-persons underneath are apparent, or the edges of other y-persons might appear so as to represent a stack of ypersons). The system is illustratively configured to enable the user to switch between different ypersons or groups of ypersons as desired, which will illustratively initiate appropriate and corresponding changes within the VisualY programming and language representations in relation to the model framework.

In one embodiment, the yperson focus can be set to a class of people or a very large number of people. For example, can illustratively set to all republicans in the United States, or all people in China, etc. Also or alternatively, it can illustratively be set to a hypothetical but not necessarily specific person, such as an "open-minded person" or "a Christian." In one embodiment, the yperson can be set to be the "average" person, determined by all people that the user has included in a "stack" of ypersons within are 326. In this case, the selected yperson would be a conglomeration of all persons included in the stack.

In one embodiment, the selected yperson can even be selected to be a non-human but living creature. For example, the yperson can be selected to be an ant, or a breed of dog, or a specific dog. Any living thing can, in one embodiment, be chosen as the focus of the representation within areas 326. However, the focus of the representation within areas 326 can be something other than a living thing. It can be a deity, a fictional character, an organization, a fictional organization, or anything else.

As has been hinted at, it is to be understood that some or all of cells 312 support some degree of data input. For example, when the yperson context is set to a specific individual, it might be implemented for a purpose such as that person's medical chart. Both the doctor and the patient (i.e., the individual) can illustratively interact with the model framework 164 utilizing mechanisms of the VisualY programming and language so as to add information to the framework and thereby to the chart. For example, the doctor might navigate through the model framework and add information in an appropriate cell 312 location regarding the result of lab tests for the individual. The individual might navigate through and add, in an appropriate cell 312 location, information as to how they are feeling and when they were feeling it, or what they ate and when they ate it, etc. Then, in accordance with one aspect of the present invention, the mode framework is programmed to some extent to respond to the entered information by automatically implementing VisualY mechanisms that depict appropriate and logical connections to other cell 312 constructs.

Accordingly, the model framework 164 and the mechanisms of the VisualY programming and language combine to make it possible, for example, to represent complexities of a human state of being (even during any desired user-selected period of time, as described above). Further, the direct human aspects of the state of being (i.e., shown in relation to cells 312 on side 308 of line 306) are represented in direct relation to more fundamental aspects of the state of being (i.e., shown in relation to cells 312 on side 310 of line 306). Thus, in one embodiment, it becomes possible to show what foods were eaten in combination with even the most fundamental components of those foods, and what impacts eating the foods have on the yperson.

It is worth emphasizing that the model framework components and the related VisualY language and programming representations will, by design, vary based on commands and preferences received from the user. The user will illustratively only see the model framework level(s) and the level of VisualY detail that they want to see, which very well may include all levels. The application is illustratively configured to enable the user to hide, fold up, or re-size cells 312 as desired to cause the application to display a desired level and scope of detail.

VisualY representations when applied to the model framework 164 enable users to see how things on all levels of nature interrelate to one another. Human constructs and ideas in one part of the model framework are actively shown (i.e., are shown in terms of their inherently dynamic and active nature) in relation to interrelated principles of the scientific foundations of the world in another part of the model framework. This reflects the fact that everything is programmed in nature, from the smallest things to the largest. Human beings have the capacity to understand the related mechanisms that drives us and that drive everything. In order to tap into this understanding, one must move away from seeing things superficially and from a very limited point of view. Instantiations of the VisualY language enables a new and better perspective of how things really are in nature.

Instantiations of the VisualY language reflect the fact that forms of existence, including but not limited to the forms of existence represented within framework 164, have at their root energy that drives atomic and subatomic existence, that drives light and gravity, that drives building block elements and forces, that drives what humans refer to as life. Everything is in play—doing something at all times—activated. Everything is dynamic. Everything is complex in that everything is, to some extent, a product of complex interaction.

Thus, instantiations of the VisualY language reflect the fact that there is a dynamic dimension to everything. Nothing is static. While instruments of science are sensitive to the constant state of change, humans on their own have a difficult time sensing it due in large part to limitations of the human senses. It should therefore probably come as no surprise that human language has not developed so as to be particularly effective when it comes to describing the dynamic and interactive dimensions of human surroundings. And because humans relay on language and senses almost exclusively for our understanding of the existence around us, and within us, we have an extremely limited day-to-day, theoretical, practical comprehension of how everything in existence works. Current systems of language consist mainly of words and do not easily enable one to fully and accurately imagine or describe different forms of existence. Current systems are inadequate at least in that they are inherently linear and for the most part two-dimensional.

Figure 9:
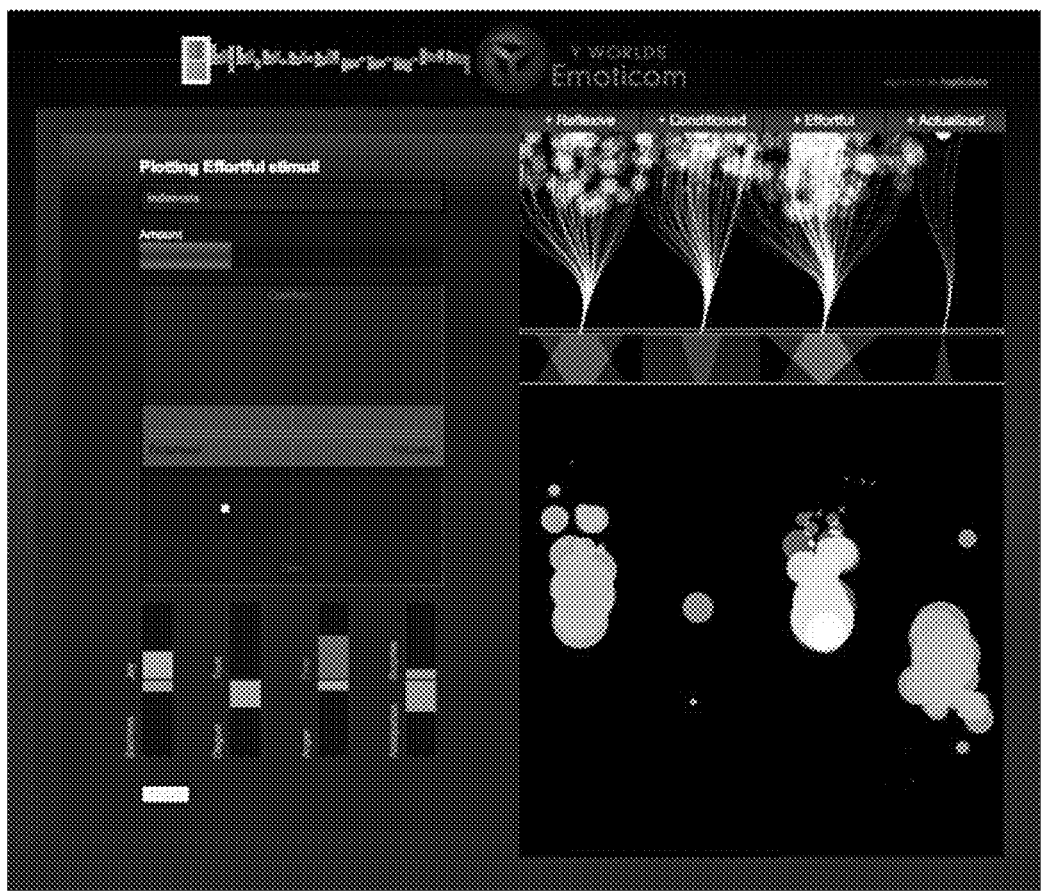
FIG. 9 is a screen shot of a multi-variable system for producing user interface components on a generative basis.

FIG. 9 is a screen shot of a multi-variable system for producing user interface components on a generative basis. On the left hand side of the screen shot are a plurality of user adjustable variables. Each variable is capable of being set to any of a range of different states. Changing the state of a variable will illustratively change the motion, color, sound, and otherwise the configuration of patterns on the right side of the screen shot.

In one embodiment, patterns such as those on the right hand side of the FIG. 9 screen shot are examples of what parts of a VisualY representation will look like. Thus, one or more of the patterns on the right hand side are depicted in conjunction with (e.g., over one or more cells) the VisualY model framework as part of an instantiation of the VisualY language. Those skilled in the art will appreciate that, when the patterns are incorporated into an instantiation, the changing of the variables may be user-initiated but some or all of them are also automatically adjusted programmatically. For example, the generative nature of the programming of engine 170 will illustratively drive changes in the variables and therefore changes in the patterns and therefore changes in the instantiation.

Figure 10:
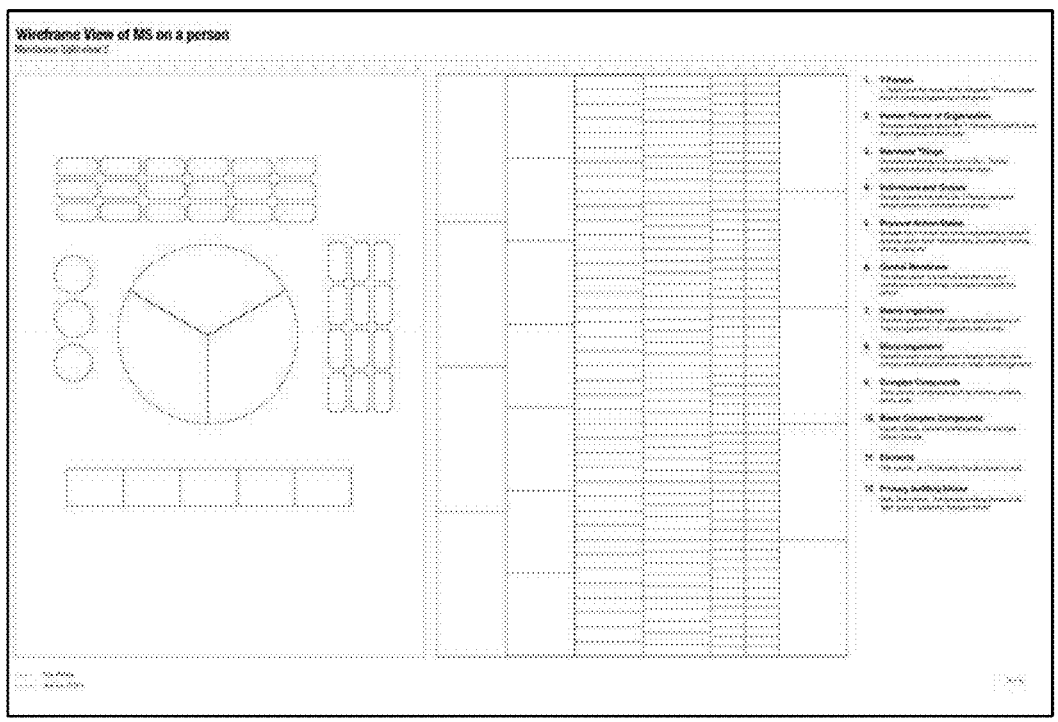
FIG. 10 is an example screen shot demonstrating an alternate view of a portion of the VisualY model framework.

FIG. 10 is an example screen shot demonstrating an alternate view of a portion of the VisualY model framework. In one embodiment, the gridded area on the right hand side of the alternate view is a substantially or entirely complete depiction of the VisualY model framework, even if the components depicted on the left hand side are only a portion of the model framework. Instantiations of the VisualY model framework are illustratively presented as VisualY representations presented in conjunctions with the model framework as shown in FIG. 10. In one embodiment, the user is able to move different combinations of sub-portions of the model framework in the left hand panel while at the same time always seeing a presentation of the more or fully complete model framework in the right hand panel. Instantiations of the VisualY language are then active in that VisualY representations are responsively and generatively presented in either or both of the panels in conjunction with the different depictions of the VisualY model framework.

Figure 11:
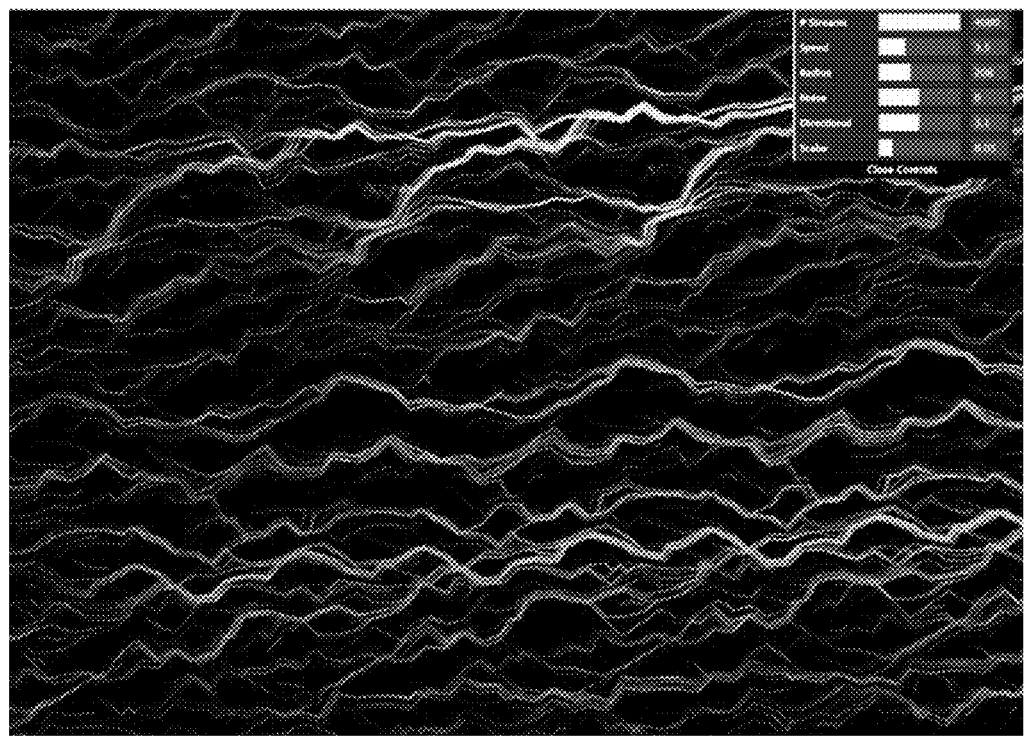
FIG. 11 is a screen shot of a multi-variable system for producing user interface components on a generative basis.

FIG. 11 is another screen shot of a multi-variable system for producing user interface components on a generative basis. In the small box in the top right hand corner of the screen shot are a plurality of user adjustable variables. Each variable is capable of being set to any of a range of different states. Changing the state of a variable will illustratively change the motion, color, sound, and otherwise the configuration of patterns shown in the rest of the screen shot.

Figure 12:
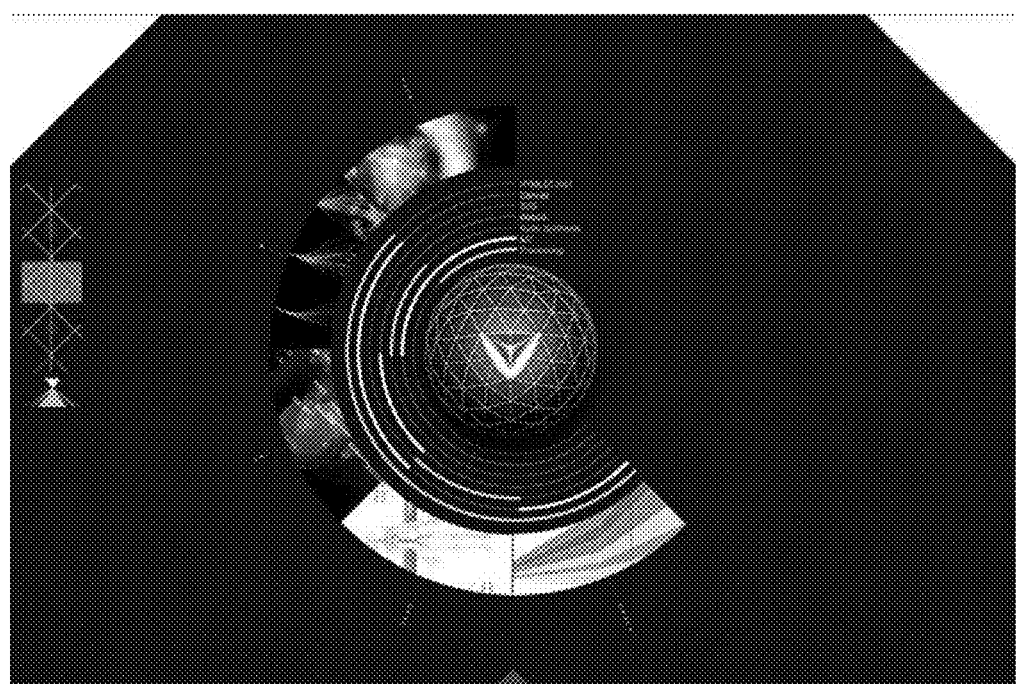
FIG. 12 is a screen shot of a user interface for selecting and thereby initiating display of an instantiation of the VisualY language.

In one embodiment, patterns such as those shown in the bulk of FIG. 11 are examples of what parts of a VisualY representation will look like. Thus, one or more of the patterns are illustratively depicted in conjunction with (e.g., over one or more cells) the VisualY model framework as part of an instantiation of the VisualY language. Those skilled in the art will appreciate that, when the patterns are incorporated into an instantiation, the changing of the variables may be user-initiated but some or all of them are also automatically adjusted programmatically. For example, the generative nature of the programming of engine 170 will illustratively drive changes in the variables and therefore changes in the patterns and therefore changes in the instantiation. FIG. 12 is a screen shot of a user interface for selecting and thereby initiating display of an instantiation of the VisualY language.

Accordingly, embodiments of the present invention pertain not just to data visualization but to knowledge visualization. In one embodiment, all instantiations of the VisualY language are supported, meaning assumptions in the VisualY model framework and/or the VisualY representations, by proofs that are may be accessed, for example but not by limitation, by navigating (e.g., navigating to a lowest level) through the VisualY model framework as described herein. The proofs illustratively provide source data to back up the assumptions in terms of how constructs are related and presented as being connected.

In one embodiment, relationships such as but not limited to data relationships are embedded in the coding of the VisualY language. Thus, the system is generative at least in that the applications engines use data to determine, for example based on first principles as described herein, what the programmatic response of the VisualY instantiation will be. In essence, the behavior of a manifestation of the VisualY language over time is illustratively generative in that it is data dependent—and those dependencies are designed with the intent of being as consistent as possible with first principles of science and nature. The dependencies are illustratively adjusted as necessary to be as accurate as possible. Thus, manifestations of the VisualY language are much more than simple data visualization. The manifestations are such that data is truly relational in that it is built into the programmatic assumptions of the coding.

Further, embodiments described herein go beyond known methods and systems in the field of semiotics. Embodiments do involve semiotics in the sense that they incorporate unique uses of signs, sign systems and sign processes, symbols, signification, systems of communication, meaning, language, biosemiotics, and computational semiotics. However, embodiments described herein also involve cognitive semiotics, and embodiments involve a semiotic coding system incorporating syntactics and cybernetics. The systems in which knowledge is presented in accordance with instantiations of the VisualY language are organic in that they are dynamically generative and not necessarily predetermined or static. Embodiments are robust and scalable.

In one embodiment, the VisualY language is organized around an objective driven concept. What the user sees in an instantiation of the VisualY language is what they want. The user essentially makes selections and navigations so as to adjust the instantiation and effectively filter the user interface down to what they want.

The spirit of the VisualY language is rooted in the study of semiotics at least in that it prescribes multimedia devices as core components of a system for communicating representations of complex knowledge. Standardized signs, symbols, colors, patterns, motions and sounds are set against a standardized multi-level ontological framework of maps and map views. Standardized tools (illustratively but not necessarily Internet browser based tools) are provided to enable a distributed community of users to interact with and/or enhance the multimedia representations and/or the framework. Thus, members of the user community operate in a wiki-style format to communicate with one another using the language of VisualY.

Figure 13:
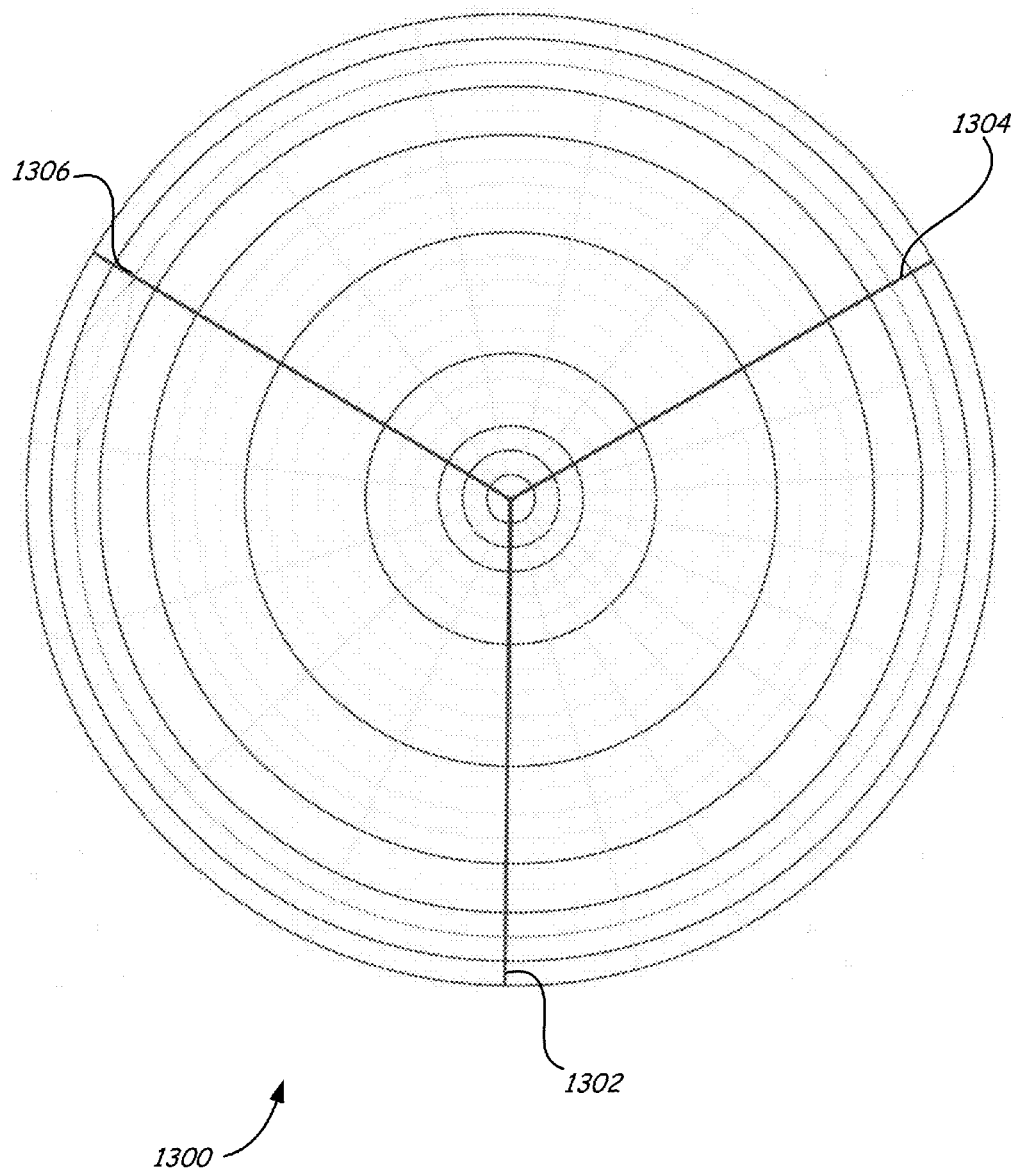
FIG. 13 is an illustrative screenshot representation of a limited portion of an embodiment of the VisualY framework.

FIG. 13 is an illustrative screenshot representation of a limited portion 1300 of an embodiment of the VisualY framework. Portion 1300 illustratively represents a person that is the focus of an active instantiation of the VisualY language. Portion 1300 is illustratively an expanded view of the circled "Y" human focus area 326 of the "forms of existence" framework scheme shown in FIG. 3.

In order to emphasize the concept of variable segmentation as it pertains to embodiments of the present invention, the portion 1300 shown in FIG. 13 has many more cells than the Yperson representation in area 326 of FIG. 3. With that in mind, the representation 1300 and the representation in area 326 are illustratively alternative VisualY framework representations of the same thing, the differences between the two representations being attributable to the state of a user-adjustable mechanism for choosing a desired level of displayed detail. The user can, directly or indirectly, intentionally or unintentionally, increase or decrease the level of detail by manipulating a user control provided within the application user interfaces.

In one embodiment, the representation in FIG. 13 is what the user sees after they increase the size of the Yperson representation in area 326 of FIG. 3. For example, but not by limitation, the user may do this by effectuating a pinching gesture wherein two of the user's fingers are placed against a touchscreen on the Yperson representation in area 326, and then the fingers are slid away from one another in a manner similar to how many photo applications enable a user to increase the size of an image such as a photograph. By performing and perhaps repeating this gesture, the user is illustratively able to increase the size of the Yperson representation until it looks similar to what is shown in FIG. 13. Obviously, the enlarged representation has more framework cells than its smaller counterpart. In one embodiment, as the size is increased, more cells begin to pop into the Yperson representation. These cells are illustratively swept into the larger image from other underlying levels of the framework.

The framework representation 1300 in FIG. 13 is shown without any indication of other portions of the VisualY framework outside of the circled "y" portion. However, in one embodiment, representation 1300 is simplified in that other portions of the framework are likely to be represented together with the circled "y" portion 1300. For example, representations of cells on other levels of the VisualY framework may be included. Also or alternatively, other framework portions and cells from the same framework level such as but not limited to any of the other cells in areas 308 and 310 of the FIG. 3 framework representation. As the size of the Yperson representation in area 326 of FIG. 3 is increased, other portions of the framework need not be eliminated to make room but may instead be shrunken or otherwise simplified (e.g., a smaller short-hand representation, or a more encompassing collective representation) to accommodate the transition to a more detailed representation of the circled "Y" portion of the framework, such as that shown in FIG. 13.

Figure 14:
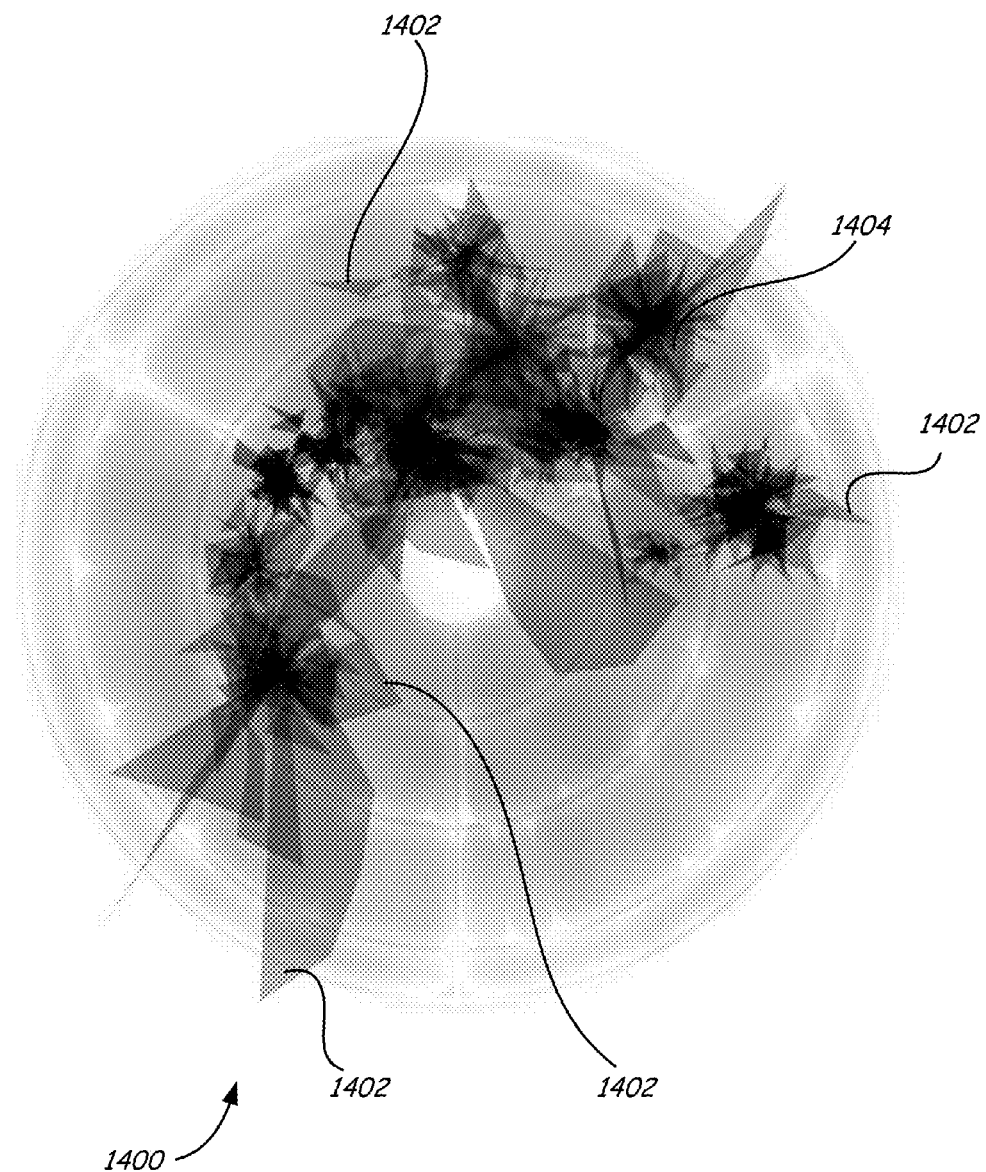
FIG. 14 is a static illustration of a dynamic VisualY representations.
Figure 15:
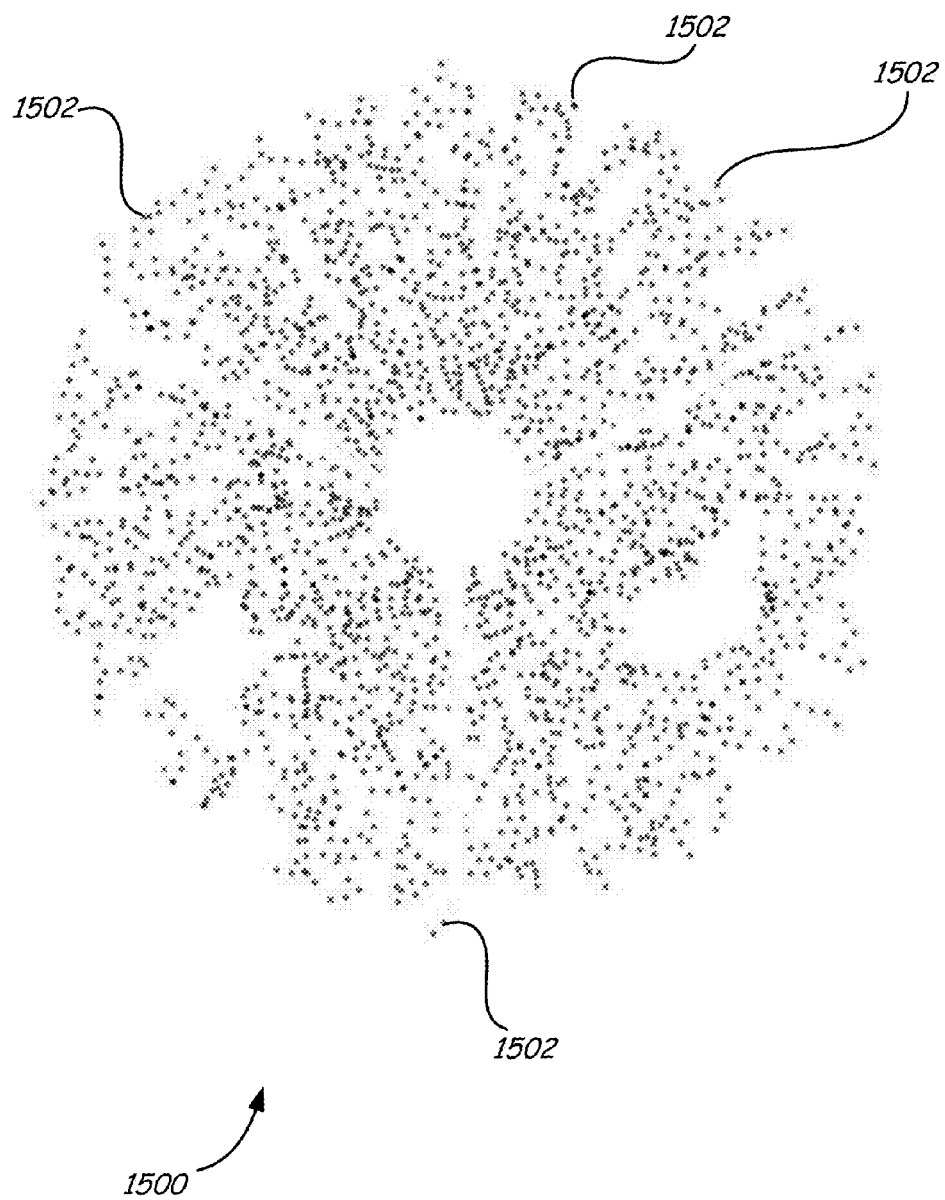
FIG. 15 is a static illustration of a dynamic VisualY representations.

What is not really represented in either of FIG. 3 or 13 is any significant signs, symbols, colors, patterns, motions or sounds provided as part of a VisualY representation in accordance with an instantiation of the VisualY language. FIGS. 14 and 15 are illustrative screenshot representations of an active VisualY representation being depicted, as part of an active instantiation of the Visual Y language, in relation to an expanded view of the circled "Y" human focus area 326 of the "forms of existence" framework scheme shown in FIG. 3. It is to be understood that FIGS. 14 and 15 show non-moving black and white representations but are actually likely to include color, motion, and even sound.

The VisualY representation 1400 of FIG. 14 includes a plurality of moving, semi-transparent shards 1402 (only a representative few have been labeled). Each shard 1402 illustratively is connected at some location to at least one segment or cell included in the underlying portion of the VisualY framework. The shards thereby represent activity within that segment or cell of the framework.

In areas of representation 1400 such as area 1404 where multiple shards are bunched together, this can mean that multiple shards are connected to the same segment or cell. Also or alternatively, it can mean that the current user-selected level of framework detail is not "zoomed out" enough to enable a more clear distinction between shards and their associated segments or cells. In one embodiment, the user can adjust the view of the VisualY framework so as to change the depicted perspective of a single segment/cell or a group of segments/cells and thereby relieve the congestion of shards.

Shards 1402 are programmatically configured to convey meaning and relationships between segments/cells through mechanisms such as but not limited to their color, patterns, movement and/or associated sounds. In one embodiment, to the extent possible, the meaning and relationships conveyed by the shards 1402 are established and adjusted automatically or manually by users of the application (such as by gatekeeper 120 or users 110 through user N shown in FIG. 2) in order to maintain as much conformance as possible with first principles of science.

The VisualY representation 1500 of FIG. 15 includes a plurality of moving dots 1502 (only a representative few have been labeled). Each dot 1502 illustratively is connected at some location to at least one segment or cell included in the underlying portion of the VisualY framework. The shards thereby represent activity within that segment or cell of the framework. Within FIG. 15 the boundaries of the underlying segments/cells of the VisualY framework are not specifically shown other than where there is a relative absence of dots forming a capital "Y" shape. In one embodiment, a clearer depiction of one or more segments/sells can be selectively (e.g., in accordance with a user-actuated control) or automatically added to the representation 1500.

In areas of representation 1500 such as area where multiple dots 1502 are bunched together, this can mean that multiple dots are active relative to the same segment or cell of the VisualY framework. Also or alternatively, it can mean that the current user-selected level of framework detail is not "zoomed out" enough to enable a more clear distinction between dots 1502 and their corresponding segments or cells. In one embodiment, the user can adjust the view of the VisualY framework so as to change the depicted perspective of a single segment/cell or a group of segments/cells and thereby relieve the congestion of shards.

Dots 1502 are programmatically configured to convey meaning and relationships between segments/cells through mechanisms such as but not limited to their color, patterns, movement and/or associated sounds. In one embodiment, to the extent possible, the meaning and relationships conveyed by the dots 1502 are established and adjusted automatically or manually by users of the application (such as by gatekeeper 120 or users 110 through user N shown in FIG. 2) in order to maintain as much conformance as possible with first principles of science.

Accordingly, it is within the scope of the present invention for VisualY representations to demonstrate knowledge in many ways such as but not limited to patterns of relationships between multiple variables (i.e., between multiple cells or segments) utilizing mechanisms other than a visual line or other similar connecter joining related elements. Utilization of a line or other similar connector is less effective approach to demonstrate relatedness at least because it is a very inefficient use of display space. Further, human beings have a difficult time following and deriving meaning from more than a couple of lines at a time. A representation with many, many lines makes it very difficult to identify pattern differentiators within complex systems, and these differentiators can be indicative of especially interesting knowledge.

As opposed to a static image filled with many lines and nodes, instantiations of the VisualY language are capable of depicting knowledge patterns across numerous dynamically adjustable variants and dimensions. The instantiations may be selectively altered by a user to accommodate any special circumstance, perspective, variable, time context, or view. The user is able to make adjustments to variables applicable to the VisualY representation and/or the VisualY model framework, and then experience the effects of those adjustments on the instantiation, and therefore the effects of those adjustments in actual existence because the effects are programmatically determined based on first principles of science. VisualY language instantiations are adaptive, scalable, and not limited to a specific domain or context.

Further, instantiations of the VisualY language enable users to easily see and understand knowledge across many variables because patterns are easy to differentiate across the broad and encompassing VisualY framework. The user sees connections between variables (e.g., between segments and cells of the VisualY framework) from an overall system perspective but still across many different levels of nature and existence.

In one embodiment, VisualY representations are also programmatically configurable to take into consideration an objective input by a user of the application. In this case colors, motions, patterns, sounds and other VisualY representation mechanisms are presented in the context of the VisualY model framework so as to programmatically account for the input objective. This makes it even easier for the user to pick up on important knowledge in the form of, for example, patterns among the different segments/cells because the VisualY instantiation and the user are on the "same page" in terms of understanding the objective context of the instantiation. Users can illustratively choose any type of objective such as, but certainly not limited to, to learn about a particular topic, to shop for a particular item, to make a decision, or to find a particular place.

It is worth pointing out that, as broad and encompassing as instantiations of the VisualY language may be, there are limitations incorporated into in the representative scheme in order to impose a predictable level of contextual predictability and standardization. These limitations are the tools utilized to communicate the differentiating patterns that communicate knowledge. The VisualY model framework provides a pre-built model framework and associated fixed views that users of the application can depend upon to remain consistent in format. Even the VisualY representations include some degree of predictability such as a limited color scheme and a limited number of visual mechanisms for showing connections between variables. The standardized elements of the VisualY schemes are the tools with which complex knowledge is communicated as an instantiation of the VisualY language.

With all of this in mind, one can imagine a user experiencing an instantiation of the VisualY language. For example, the user will illustratively see where VisualY representation activity within the VisualY model framework is the greatest, perhaps after communicating and causing a particular objective to be added to the calculus of the presented patterns. The user will see currents across segments/cells within the model framework demonstrating movement acorss different dimensions and/or relationships between different segments/cells. For example, related segments/cells may have the same moving cross-hatch pattern, which may or may not be the same color. Different colors will signal something about the relationship to the user and that something will be understood because that type of differentiation will be utilized in the same way consistently in the VisualY scheme to signify the same relationship characteristic. Finally, the user will illustratively be able to activate and deactivate different user input controls in order to change filters and thereby change the current instantiation of the VisualY language to a different but possibly related instantiation of the VisualY language. The user can illustratively change which sengments/cells are larger or smaller in order to gain a more clear understanding of how the VisualY representation interrelates different variables. The use is in control. The user gets to choose their objective and also chose how they experience what it is that they are seeing. By navigating around through the model, making adjustments to variables as desired, and by changing how information is presented, the user is able to look for important patterns that are indicative of knowledge and/or are indicative of what it is that the user is searching for in terms of their communicated objective. Thus, the user drives the data visualization processes looking for patterns in color, angles, flows, motion, sound and the like in the context of the model framework and its understood components.

Instantiations of the VisualY language are an excellent device for clearly communicating knowledge involving simultaneous actions. Many known devices for communicating knowledge are extremely linear and only address one action at a time. It is left to the individual to derive an understanding as to how multiple, separate actions coincide and are interrelated. Some devices may provide insight into the inter-relationship between a couple of actions but attempts to move beyond a couple of actions quickly become muddled with information that make it difficult if not impossible for humans to clearly understand.

For example, to effectively understand the economic situation of a given country, one should consider active interrelationships between how different categories of citizens feel, business performance, the effects of the influence of other countries, changes in political leadership, etc., etc., etc. An instantiation of the VisualY language enables a user to experience the effects of a tremendous number of variables at the same time. The human mind is able to process the colors, motion, patterns, symbols, sounds and other mechanisms of a VisualY representation in a much more efficient and sophisticated way than it can derive meansing from complex simultaneous actions presented in charts, graphs, language, and even traditional computer simulation. Further, a user can easily navigate through different levels and perspectives of the VisualY framework in order to increase or decrease the complexity of the context within which the VisualY representation is presented, thereby enabling a customized focus on what is of particular interest to the user. Further, the user can selectively alter variables an experience how the impact of that alteration on the many other variables in the system. The results of the alteration may be unexpected, though still rooted in the first principles of science upon which interactions and behaviors of VisualY representations are programmatically bound.

An instantiation of the VisualY language is also especially effective at providing an understanding of how different actions play out relative to each other across time. The user is able to selectively determine a time period over which elements of VisualY representations move and change, thereby indicating what is happening on many different levels of existence over that time period. Sticking with the example of a user interested in the economy of a given country, the user can, for example by using a user interface mechanism to assign a specific value or values to one or more of the VisualY framework cells, set the VisualY representation to the country of interest and to the economic status of that country. Then, the user can similarly provide inputs that will cause a VisualY representation of the status of the economy of the selected country to be shown at a certain rate over a certain time. For example, the user might request that the representation encompass a 100 year period at one year per minute, or a 1 year period over one month per minute, etc. As events such as war affect the economy of the country in the actual events of history those events will be represented in the colors, motions, sounds, symbols, cell interrelationships and other mechanisms of the VisualY representation. Thus, the user is able to experience the effects of many different variables over time. Again, the user is in charge of what they want to see in a given instantiation of the VisualY language and how they want to see it.

An instantiation of the VisualY language is also especially effective at providing an understanding of how different actions play out relative to each other across space. The user is able to selectively determine, for example by setting an applicable instantiation view or representation parameter when space (e.g., geographic or otherwise) is to be accounted for in a given VisualY representation. Thus, an instantiation of the VisualY language enables a user to observe patterns of existence across space. For example, the user can set the application to for the objective learning about how a clothing article such as a pair of pants came to exist over time and space. This could mean VisualY elements moving and lighting up in relation to indications in the VisualY framework of different geographic regions in the world where different materials in the pants originated. However, rather than simply being tightly focused on the broad concept of the material itself, many related variables related to the production of the materials such as labor considerations, national economic considerations and any other of other variables will be accounted for in the instantiation and brought to the user's attention in the form of the colors, motions, sounds and other mechanisms of conveying information as part of the VisualY representation. If the user becomes interested in any particular element of the representation, here or she can manipulate the VisualY framework context and/or the views or configuration of the VisualY representation settings as desired to focus on what is of interest at the moment.

Accordingly, instantiations of the VisualY language go much deeper than simply data visualization. Data visualization is far more limited in terms of being able to clearly communicate interrelationships among many changing variables. Unfortunately, humans are used to attempting to answer questions within the grasps of such constraints. Instead the instantiations of the present invention are vehicles for communicating much deeper knowledge and answering questions in a far more encompassing and accurate way. For example, a question like whether coffee is bad for you is complex and dependent upon a multitude of variables such as but not limited to everything else the person is eating and drinking, the age of the person, their gender, what is in the coffee, what kind of coffee is it, where did the coffee come from, what is in the water used to make the coffee, where did the coffee come from, what is the price of the coffee, where did it come from, who harvested the coffee and how were they compensated, etc. There are many potential variables to consider and an instantiation of the VisualY language is an effective tool for considering more than the interplay of just a couple of the variables.

The fact of the matter is that there is often a gap between what is really happening and what is perceived or understood. An instantiation of the VisualY language enables a conveyance of what is actually happening, for example in accordance with first principles of science. Using language, charts, bars, graphs, and the like it is extremely difficult to communicate, for example, the interplay of 24 different variables that contribute to an action that, on the surface, seems much simpler. For example, when you ask a person how they are feeling after a long run, they might simply report being tired or a little bit sore. But an instantiation of the VisualY language will demonstrate the actual physical map the body including information such as where muscles are torn or stretched, where stress is having an impact, where the body is not functioning properly, etc. The mechanisms of a VisualY representation will cause color, motion, sound, patterns and the like to bring many portions of the VisualY framework to an active state that will immediately convey deep knowledge that is otherwise ignored or overlooked.

One can imagine a scenario in which a user inputs a particular objective into the system, specifically to learn about head injuries in general and concussions in particular. Referring to the Yperson framework portion 1300 shown in FIG. 13, there are illustratively different points of entry into the Yperson. At least one of the framework segments/cells in the bottom right-hand area of the "Y" model between lines 1304 and 1302 illustratively is designated as being a point where an absorption of kinetic energy occurs as part of an exchange of kinetic energy. That cell illustratively lights up in the color red to show the kinetic energy coming into the Yperson.

As an aside, the color red is illustratively part of a limited spectrum of colors that are permitted within instantiations of the VisualY language. For example, in one embodiment, two different shades of red are utilized to signify varying degrees of bad or degrees of general negative connotation. The darker of the two reds illustratively signifies more bad than the lighter shade. Two different shades of green are illustratively utilized varying degrees of good or degrees of general positive connotations. The darker of the two greens illustratively signifies more good than the lighter shade. Then, there is illustratively a color between the good and bad shades to indicate a neutral connotation—as in neither bad nor good.

Continuing with the concussion example, the kinetic energy entry point in the bottom right-hand portion of the Yperson 1300 illustratively lights up with the a shard or dot or some other pattern to indicate the kinetic energy coming into the Yperson. This is the beginning of the VisualY representation. As the representation continues, the pattern illustratively shows transference of the red to other cells in the bottom right-hand portion. For example, other cells illustratively light up so as to indicate blunt force damage to the brain in general and more specifically to certain parts of the brain. The color significant components of the VisualY representation continue to move from cell to cell in accordance with first principles of science as imposed by the engine described above in other sections. Relevant connections between the various segments/cells are shown in any of a variety of different ways during the VisualY representation such as a moving flow of the shards, dots or a similar image elements from cell to cell. Also or alternatively, similarly configured moving or static cross-hatching is incorporated into separate but related cells. When two cells have the same cross-hatch pattern and/or a cross-hatch pattern with flowing motion in a similar direction, an inference of interrelatedness can be assumed. As will become apparent, in conjunction with the propagation of the kinetic energy from cell to cell in the bottom right hand portion of the Yperson, additional VisualY cell activity in other conscious and subconscious regions of the Yperson will activate and begin their own programmatic patterns in response to the event.

The described blunt force entry of kinetic energy into the Yperson illustratively is depicted within the VisualY representation as a flare of energy that comes from outside of the VisualY framework portion 1300 of FIG. 13 and enters at the kinetic energy absorption point in the bottom right hand region. There may be an indication of the object with which the Yperson has collided when the blunt force occurred. In one embodiment, the playing out of the VisualY representation includes a corresponding coordinated video in an area of the VisualY framework such as area 366 in FIG. 3. The video might, for example, show an image of a person (i.e., the Yperson) being struck in the head by a hockey puck. The activity occurring within the Yperson framework 1300 and other portions of the VisualY framework is illustratively timed with the video in terms of what is happening and when. The timing is illustratively as consistent with first principles of science as possible, which is programmatically accounted for in the logic carried out by the VisualY engines.

At the same time as the effects of the collision are being shown within the Yperson 1300, the effects are also being accounted for in terms of simultaneously relevant activity in other relevant portions of the VisualY framework. For example, cells are progressively lit up in area 310 to show what is occurring at the molecular and other levels of existence. It is important to understand that the depiction of what is occurring as a result of the collisions is not limited to only the impact with the Yperson context.

Following the point of impact in the lower right hand portion of the Yperson, the VisualY representation activity illustratively radiates to additional relevant segments/cells eventually more toward the center of the circle. This is not arbitrary but is consistent with the programmatic scientific considerations that the impact will affect areas having to do with processing. The effect of the impact will generally show up in the segments of more micro scoped human functions and considerations but then will permeate into macro scoped functions and considerations. In one embodiment, the impact will cause a flare that pulses and then stays to some extent in certain segments/cells as time goes on. Again, this is not arbitrary but is consistent with the first principles of science upon which the behaviors of the VirtualY representations are based.

The concussion representation activity illustratively moves through the human processing ring segments and propagates through molecules, etc. Impacted human cells are reflected as being affected, for example activity occurs in certain framework segments to represent an impact on surface cells, as well as deformed and possibly damaged brain cells. One after another, relevant framework cells will light up with activity, often with red areas of activity to indicate a negative impact. Framework segments/cells will activate when a change in the heart (e.g., change in beat pattern) or other organs occur. Activation occurs certainly to show different effects on the nervous system.

Some cells may present neutral activity. For example, the Yperson's predisposition to negative concussion effects may be factored into what occurs. The predisposition may be a variable that can be adjusted by the user before and after starting or re-starting the presentation of what happens as a result of the impact.

The effects of the impact will, when the time is right, propogate into the upper segments/cells in the top of the Yperson representation. This is where conscious considerations are accounted for. The framework cells that light up in the top area demonstrate when the touch of the impact is consciously observed. This is where the cognitive repercussions of the impact will be depicted. The bottom left side of the yperson is where the framework cells related to subconscious considerations are accounted for in the activated cells of the VisualY representation.

Accordingly, the effects of the impact will propagate into all areas of the Yperson where, according to first principles of science, there is any sort of impact. The person interested in concussions will become aware of relevant considerations not just on all levels of the Yperson but on all levels represented in the larger VisualY framework. The user can interact with application input mechanisms to start, pause, and re-start the impact and the events that occur before or after it. The user can, at any time, similarly interact with input mechanisms so as to change framework views, change the number and size of segments and cells in certain areas of the framework, change parameters or variables accounted for in what happens in accordance with the applicable first principles, etc. The user can explore the effects of the impact on all different levels, and can see the simultaneous effects of the impact on lots of different levels. The concussion-focused instantiation of the VisualY language indicates all relevant exchanges and states from those pertaining to electrical currents to those pertaining to chemical reactions, as well as hormonal changes, social considerations, emotions, feelings, etc. The user can modify variables such as different treatment options to see the effects of the treatments on the many levels of what has and is being represented.

It is worth elaborating upon the "language" part of the VisualY language. In accordance with another aspect of the present invention, the VsualY language is a language at least because sophisticated visual and auditory components that humans are especially skilled at are selected for a particular manifestation based on the meaning that they convey. In other wrods, a manifestation of the VisualY language is a selected and specially configured set of the sophisticated visual and auditory components. The selection and configuration of the set of components is done based on standardized meaning assigned to each component.

The VisualY language includes a many different attributes of visually perceivable movements, each attribute of movement potentially having a different meaning assigned or otherwise attached to it. Fast movement, for example, illustratively may mean one thing (e.g., but not by limitation, urgency or rapid change), while slow movement may mean another (e.g., but not by limitation non-urgency or slow change). Of course, attributes of movement to which meaning is attached in accordance with the VisualY language are not limited to one attribute extreme or the other. An attribute or characteristic of movement to which meaning is assigned may fall as a matter of degree anywhere on a continuous spectrum from one extreme to the other, the relative position on the spectrum potentially communicating an assigned meaning in and of itself.

Meaning within the language of VisualY is attachable to any attribute of moment, no matter how subtle. This is an especially interesting part of the present invention because the human brain is particularly well suited for perceiving even subtle attributes of movement. For example, meaning can be assigned to the direction of movement, to the relation of movement in terms of proximity to other visual components, to the smoothness or non-smoothness of movement, to relativity of multiple moving components, to direction of movement, to a pattern of movement, to amplitude of movement, to expansiveness of movement, to changes in a pattern of movement, to a relationship between movement and sound, to texture of movement, to a relationship to what in particular is moving, to what is created as the movement occurs, to changes caused by the movement, etc., etc., etc. Of course, these are but examples of attributes of movement to which meaning may be attached as part of the VisualY language. The scope of the present invention is certainly not limited to these examples. Thus, instantiations of the VisualY language convey layers upon layers of meaning through the movement of visual components, and the human brain is well suited to pick up much more of such meaning than is possible when taking in meaning from a spoken language.

What exactly it is that is moving may also play a role in the meaning that is conveyed as part of an instantiation of the VisualY language. For example, what it is that moves may be lines, integrated groupings of colors, patterns, etc. The component that is moving itself illustratively has assigned meaning and the movement adds to that meaning. Instantiations of the VisualY language reflect the energy of the way things move and interact in reality (or reality as it has been defined in the context of the particular instantiation). This comes as no surprise because the programmatic logic that determines how movement is allowed to be presented is illustratively based on first principles of science applied by the engines that have already been described in other sections of the present invention. Thus, by watching an instantiation of the VisualY language, the user becomes aware of the energy and interactions of what it is that they are watching. Shape, color, form, texture and many other attributes collectively communicate an incredible amount of information to the user more at less all at once (though the actual instantiation may play out over a period of time). The flow, the relative positioning of components, movement, color and all other human perceivable attributes of a Visualy representation come together to capture knowledge and present it to the user in a very effective and efficient manner.

It is within the scope of the present invention for any observable element detectable by the human senses (primarily hearing, seeing, touching) and presentable through an application user interface (e.g., a display such as a computer screen, sound from speakers, tactile feedback provided by way of a touch sensitive output mechanism, etc.) to be assigned some level of meaning and thereby be made a part of the VisualY language. As part of the VisualY language, the element is selectively incorporated into an instantiation of the language so as to contribute its assigned meaning to the instantiation in combination with other VisualY elements contributing their own meanings so as to collectively convey information and, in particular, knowledge. Thus, the VisualY language is flexible and very effectively informative, especially when it comes to conveying the simultaneous and intertwined impact of multiple system variables, and especially as compared to other types of languages used to communicate knowledge and information, such as the spoken languages.

Additional examples of observable elements detectable by the human senses to which meaning may be assigned and thereby be made part of the VisualY language will now be provided. Color may be assigned meaning and made part of the VisualY language. For example, in one embodiment, the VisualY language includes a limited spectrum of colors with colors on one side of the spectrum representing varying degrees of "good," with colors on the opposite side of the spectrum representing varying degrees of "bad," and with one or more colors in the middle representing a "neutral" state that is neither good nor bad. When "good" colors are presented within an instantiation of the VisualY language, the user illustratively infers a good context such as happiness, pleasure or positive growth. The opposite is true for "bad" colors, which might trigger an inference of damage, pain or destruction. Of course, it is also within the scope of the present invention for the meaning of a particular color to very depending upon a contextual characteristic relevant to a particular VisualY language instantiation, such as a particular VisualY model framework context.

It is not just static or isolated representations of color that may be assigned meaning and thereby be made part of the VisualY language. Transitions between colors, combinations of colors, the shape of a visual element that includes a given color, color patterns, the proximity of color to other VisualY language elements, or any other attribute of color may be assigned meaning and made part of the VisualY language. Further, any attribute of color such as shade, brightness, coolness, warmness, hue, saturation, texture, shadow, transparency, opaqueness, luminosity, cultural considerations, popular dispositions or connotations, psychological or emotional variables, physiological variables, environmental variables, variables related to achromatic simultaneous contrast properties, variables related to metamerism properties, or any other properties or variables may be assigned meaning and made part of the VisualY language.

Sounds may be assigned meaning and made part of the VisualY language. For example, in one embodiment, the VisualY language includes a limited spectrum of tones with tones on one side of the spectrum signifying varying degrees of the occurrence of rapid change, with tones on the opposite side of the spectrum signifying varying degrees of the occurrence of slow change, and with one or more tones in the middle representing a "neutral" state where there is little or no change occurring at all. Of course, it is also within the scope of the present invention for the meaning of a particular sound to very depending upon a contextual characteristic relevant to a particular VisualY language instantiation, such as a particular VisualY model framework context.

It is not just static or isolated sounds that may be assigned meaning and thereby be made part of the VisualY language. Transitions between sounds, combinations of sounds, visual components with which sound is affiliated, the apparent source of sound, the shape of sound, sound patterns, the proximity of sound to other VisualY language elements, or any other attribute of sound may be assigned meaning and made part of the VisualY language. Further, any attribute of sound such as the speed, frequency, loudness, coolness, warmness, perceived abrasiveness, cultural considerations, popular dispositions or connotations, psychological or emotional variables, physiological variables, environmental variables, or any other properties or variables may be assigned meaning and made part of the VisualY language.

In accordance with another aspect of the present invention, an instantiation of the VisualY language also includes one or more related "proofs." Users are able to selectively access those proofs by way of user interface proof navigation elements. A "proof," as that term is used herein, is a record, illustratively a visual record of evidence, hypothesis, logic, reason, validity, assumptions, intent, accuracy, systematic completeness, or another consideration reflected in the VisualY representation and or VisualY framework of the associated instantiation of the VisualY language.

A proof for an instantiation of the VisualY language is illustratively itself an instantiation of a proof model. In other words, there is a proof model that includes a variety of different proof elements and proof element details that are selectively combined (e.g., by way of user input, programmatic automated input, etc.) so as to form an instantiation of the proof model for a given instantiation of the VisualY model. In one embodiment, the proof model includes triangular shapes that interconnect in a way that is indicative of derived relationships amount evidence, hypothesis, logic, reason, validity, assumptions, intent, accuracy, systemic completeness, etc.

Embodiments of the present invention provide a new approach to resolving the meaning of everything, the workings of everything, the knowledge of everything and the complex code and interactions of everything. While much of the present description has been focused upon the visual and audio delivering methods for conveying patterns of meaning, it is worth elaborating upon the types of meaning that can be conveyed using embodiments of the present invention. Below is a non-exhaustive list of the first principles meaning and knowledge that may be conveyed by pattern and form in accordance with aspects of the present invention. In accordance with aspects of the present invention, dynamic generative patterns applied to models can directly convey all forms of systemic meaning and knowledge, including:

Cause/Effect
Variables Involved
Input/Reactor/Output
Add/Subtract
Attract/Repel
Reproduce/Replicate/Generate/ReGenerate/DeGenerate
Change: time, space, proximity, state, condition, energy, matter/material, form Exchanges/Transformations/Interactions
Core Code/Genetics/Programming
Transducers/Catalysts/Amplifiers
Sensors/Activators/Switches/Controllers/Converters/Catalysts/Ignitors/Reactors
States: Energy/Functionality/Optimization Behavior/Multiple Synchronous Behaviors/Multiple Asynchronous Behaviors/Concurrent Behaviors/Sequential Behaviors
Movement: momentum, speed, directionality, flow, sequence, path Conscious/Subconscious/Corporal
Human Constructs
Organization/Relationship/Hierarchy/Ontology/Multidimensional Relationship
Systemic Function
Multidimensional Inter and Intra Relationships
Relativity
Proofs/Necessary Prerequisites/Validity/Chance
Building Blocks

What is claimed is:

1. A semiotic communication system, comprising:
a predefined color scheme comprising a plurality of colors each having a different assigned color meaning;
a predefined pattern scheme comprising a plurality of forms each having a different assigned pattern meaning; and
a structured visual ontological framework within which a set of the plurality of colors and forms are presented, the ontological framework comprising category segments representing a hierarchical arrangement of categories of forms of existence, the category segments including at least one human-oriented segment and at least one non-human oriented segment.

2. The semiotic communication system of claim 1, wherein said set is not user selected but instead is programmatically selected by a software engine based on generative computer code applied by a computer processor in response to one or more input variables.

3. The semiotic communication system of claim 1, wherein said set is presented within said ontological framework as part of a representation of knowledge generated by the software engine based on computer code applied by a computer processor.

4. The semiotic communication system of claim 1, wherein said set is presented within said ontological framework as part of an Internet browser based representation of knowledge.

5. The semiotic communication system of claim 1, wherein said set is presented within said ontological framework such that the set appears as originating from a particular one of a plurality of segments of the ontological framework.

6. The semiotic communication system of claim 1, wherein said set is presented within said ontological framework such that the set crosses into a human-centric portion of the ontological framework.

7. The semiotic communication system of claim 1, wherein said set is not statically presented within the ontological framework but instead is presented so as to be changing over time.

8. The semiotic communication system of claim 1, wherein said set is not statically presented within the ontological framework but instead is presented in motion so as to visually cross at least one segment boundary included within the ontological framework.

9. The semiotic communication system of claim 1, further comprising:
a predefined sound scheme comprising a plurality of sounds each having a different assigned sound meaning;
wherein a particular sound from the plurality of sounds is presented through a sound user interface at the same time as said plurality of colors and forms are presented within the structured visual ontological framework.

10. The communication system of claim 9, wherein a computer processor synchronizes said presentation of the particular sound through the sound interface with said presentation at the same time of the plurality of colors and forms.

11. A semiotic communication system, comprising:
a predefined multimedia pattern scheme comprising a plurality of multimedia elements each having a different assigned meaning; and
a structured visual ontological framework within which a set of the plurality of multimedia elements are presented, the ontological framework comprising category segments representing a hierarchical arrangement of categories of forms of existence, the category segments including at least one human-oriented segment and at least one non-human oriented segment.

12. The semiotic communication system of claim 11, wherein said set is not user selected but instead is programmatically selected by a software engine based on generative computer code applied by a computer processor in response to one or more input variables.

13. The semiotic communication system of claim 11, wherein said set is presented within said ontological framework as part of a representation of knowledge generated by the software engine based on computer code applied by a computer processor.

14. The semiotic communication system of claim 11, wherein said set is presented within said ontological framework as part of an Internet browser based representation of knowledge.

15. The semiotic communication system of claim 11, wherein said set is presented within said ontological framework such that the set appears as originating from a particular one of a plurality of segments of the ontological framework.

16. The semiotic communication system of claim 1, wherein said set is presented within said ontological framework such that the set crosses into a human-centric portion of the ontological framework.

17. A semiotic communication system, comprising:
a predefined motion scheme comprising a plurality of computer generated element movements each having a different assigned motion meaning;
a predefined color scheme comprising a plurality of colors each having a different assigned color meaning; and
a structured visual ontological framework within which a set of the plurality of colors and element movements are presented, the ontological framework comprising category segments representing a hierarchical arrangement of categories of forms of existence, the category segments including at least one human-oriented segment and at least one non-human oriented segment.

18. The semiotic communication system of claim 17, wherein said set is not user selected but instead is programmatically selected by a software engine based on generative computer code applied by a computer processor in response to one or more input variables.

19. The semiotic communication system of claim 17, wherein said set is presented within said ontological framework as part of a representation of knowledge generated by the software engine based on computer code applied by a computer processor.

20. The semiotic communication system of claim 17, wherein said set is presented within said ontological framework as part of an Internet browser based representation of knowledge.

* * * * *